United States Patent [19]
Getreuer et al.

[11] Patent Number: 5,808,980
[45] Date of Patent: Sep. 15, 1998

[54] SEEK ACTUATOR FOR OPTICAL RECORDING

[75] Inventors: Kurt W. Getreuer; Leonardus J. Grassens, both of Monument, Colo.

[73] Assignee: Discovision Associates, Irvine, Calif.

[21] Appl. No.: 419,870

[22] Filed: Apr. 11, 1995

Related U.S. Application Data

[63] Continuation-in-part of Ser. No. 105,866, Aug. 11, 1993, abandoned, which is a continuation of Ser. No. 657,155, Feb. 15, 1991, Pat. No. 5,265,079.

[51] Int. Cl.$^6$ ..................................... G11B 7/00
[52] U.S. Cl. ........................................... 369/44.14
[58] Field of Search .................. 369/44.14–44.21, 369/44.28, 215, 249, 256

[56] References Cited

U.S. PATENT DOCUMENTS

| Re. 32,051 | 12/1985 | Ceshkovsky et al. | 369/44.14 |
|---|---|---|---|
| Re. 32,431 | 6/1987 | Dakin et al. | 369/44.14 |
| Re. 32,574 | 1/1988 | Ceshkovsky et al. | 369/44.22 |

(List continued on next page.)

FOREIGN PATENT DOCUMENTS

| 7900180 | 4/1984 | Brazil . |
|---|---|---|
| 833100 | 1/1970 | Canada . |
| 1013854 | 7/1977 | Canada . |
| 1125434 | 6/1982 | Canada . |
| 1145464 | 4/1983 | Canada . |
| A2-282288 | 9/1988 | European Pat. Off. . |
| A2-304932 | 3/1989 | European Pat. Off. . |
| A2-313818 | 5/1989 | European Pat. Off. . |
| 18037 | 1/1982 | Japan . |
| 48709 | 3/1982 | Japan . |
| 64649 | 4/1983 | Japan . |
| 115031 | 6/1985 | Japan . |
| 129937 | 7/1985 | Japan . |
| 219640 | 11/1985 | Japan . |
| 247854 | 12/1985 | Japan . |
| 17230 | 1/1986 | Japan . |
| 182642 | 8/1986 | Japan . |
| 248241 | 11/1986 | Japan . |
| 205540 | 9/1987 | Japan . |
| 1628236 | 11/1990 | Japan . |
| 1670392 | 6/1991 | Japan . |
| 6-223389 | 8/1994 | Japan . |
| 92-25208 | 12/1992 | Rep. of Korea . |

OTHER PUBLICATIONS

H. Ide, et al., *Write Control Method for High Density Magneto–Opticla Disk System*, Joint International Symposium 1993 IEEE Catalog #93TH0548–8, pp. 61,62.

(List continued on next page.)

*Primary Examiner*—Nabil Hindi
*Attorney, Agent, or Firm*—Ronald J. Clark; Robert T. Braun; Donald Bollella

[57] ABSTRACT

An apparatus for optically reading or recording information on an optical disc which is rotatable about an axis of rotation. The apparatus includes a frame, a carriage movable relative to the frame along a path orthogonal to the axis of rotation, and a carriage drive for driving the carriage along the orthogonal path. Specific portions of the carriage drive are mounted on the carriage so that the carriage and the mounted portions define a center of carriage mass. An objective lens having an optical axis along a Z-axis and a center of lens mass is provided in an objective lens holder. The holder is movable relative to the carriage and receives a beam of light traveling along an X-axis. Flexures are provided for movably supporting the objective lens holder relative to the carriage. The flexures each have a hinge point within an XZ plane so that movement of the lens holder is provided by hinge action at the hinge points. A focus drive is provided for driving the lens holder which moves the objective lens along its optical axis. The focus drive and the objective lens holder define a center of fine motor mass. The center of fine motor mass, the center of carriage mass, and the center of lens mass are substantially coincident on the optical axis so that when the objective lens holder is moved in a tracking direction, moments about the Z-axis are minimized.

10 Claims, 28 Drawing Sheets

U.S. PATENT DOCUMENTS

| | | | |
|---|---|---|---|
| Re. 32,709 | 7/1988 | Ceshkovsky et al. | 369/44.17 |
| 2,432,432 | 12/1947 | MacNeille | 369/44.14 |
| 3,310,792 | 3/1967 | Groom et al. | 369/44.14 |
| 3,518,442 | 6/1970 | Johnson | 369/44.14 |
| 3,530,258 | 9/1970 | Gregg et al. | 369/44.15 |
| 3,536,375 | 10/1970 | Mansell et al. | 369/44.14 |
| 3,652,167 | 3/1972 | Smith | 369/44.14 |
| 3,677,621 | 7/1972 | Smith | 369/44.14 |
| 3,931,641 | 1/1976 | Watrous | 369/44.14 |
| 3,997,715 | 12/1976 | Elliott | 369/44.14 |
| 4,118,735 | 10/1978 | Wilkinson | 369/44.14 |
| 4,161,753 | 7/1979 | Bailey et al. | 369/44.14 |
| 4,190,860 | 2/1980 | Somers et al. | 369/44.14 |
| 4,191,570 | 3/1980 | Shirai | 369/44.14 |
| 4,204,199 | 5/1980 | Isailovic | 369/44.14 |
| 4,210,931 | 7/1980 | Bailey et al. | 369/44.15 |
| 4,222,072 | 9/1980 | Bailey et al. | 369/44.12 |
| 4,225,873 | 9/1980 | Winslow | 369/44.14 |
| 4,228,326 | 10/1980 | Dakin et al. | 369/44.14 |
| 4,232,201 | 11/1980 | Canino | 369/44.14 |
| 4,232,337 | 11/1980 | Winslow et al. | 369/44.15 |
| 4,232,388 | 11/1980 | Isailovic | 369/423 |
| 4,234,837 | 11/1980 | Winslow | 369/44.14 |
| 4,236,050 | 11/1980 | Winslow et al. | 369/44.14 |
| 4,236,105 | 11/1980 | Wilkinson | 369/44.14 |
| 4,271,334 | 6/1981 | Yardy | 369/44.14 |
| 4,282,598 | 8/1981 | Elliott | 369/44.14 |
| 4,307,381 | 12/1981 | Isailovic | 369/44.14 |
| 4,313,191 | 1/1982 | Winslow et al. | 369/44.14 |
| 4,358,796 | 11/1982 | Ceshkovsky et al. | 369/44.14 |
| 4,370,679 | 1/1983 | Ceshkovsky et al. | 369/44.14 |
| 4,371,899 | 2/1983 | Ceshkovsky et al. | 369/44.14 |
| 4,375,091 | 2/1983 | Dakin et al. | 369/44.14 |
| 4,406,000 | 9/1983 | Shoji et al. | 369/44.14 |
| 4,414,655 | 11/1983 | Shoji et al. | 369/44.14 |
| 4,439,848 | 3/1984 | Ceshkovsky et al. | 369/44.14 |
| 4,447,722 | 5/1984 | Saimi | 369/44.14 |
| 4,449,213 | 5/1984 | Noborimoto et al. | 369/44.14 |
| 4,451,913 | 5/1984 | Elliott | 369/44.14 |
| 4,455,634 | 6/1984 | Efron et al. | 369/44.14 |
| 4,456,914 | 6/1984 | Winslow | 369/44.14 |
| 4,465,977 | 8/1984 | De Romana | 369/44.14 |
| 4,467,467 | 8/1984 | Wilkinson et al. | 369/44.14 |
| 4,488,279 | 12/1984 | Wilkinson et al. | 369/44.14 |
| 4,497,534 | 2/1985 | Sincerbox | 369/44.14 |
| 4,499,569 | 2/1985 | De Romana | 369/44.14 |
| 4,502,783 | 3/1985 | Lau et al. | 369/44.14 |
| 4,504,935 | 3/1985 | Jansen | 369/44.14 |
| 4,514,837 | 4/1985 | Van Rosmalen | 369/44.14 |
| 4,524,444 | 6/1985 | Efron et al. | 369/44.14 |
| 4,536,863 | 8/1985 | Giddings | 369/44.14 |
| 4,542,429 | 9/1985 | Nishida et al. | 369/44.14 |
| 4,562,577 | 12/1985 | Glover et al. | 369/44.14 |
| 4,568,142 | 2/1986 | Iguma | 369/44.14 |
| 4,571,026 | 2/1986 | Maurta | 369/44.14 |
| 4,571,716 | 2/1986 | Szerlip | 369/44.14 |
| 4,583,210 | 4/1986 | Winslow | 369/44.14 |
| 4,592,037 | 5/1986 | Ohnuki | 369/44.14 |
| 4,596,444 | 6/1986 | Ushida | 369/44.14 |
| 4,596,448 | 6/1986 | Kikuchi | 369/44.14 |
| 4,598,324 | 7/1986 | Efron et al. | 369/44.14 |
| 4,603,363 | 7/1986 | Rickert et al. | 369/44.14 |
| 4,611,318 | 9/1986 | Winslow | 369/44.14 |
| 4,623,837 | 11/1986 | Efron et al. | 369/44.14 |
| 4,627,038 | 12/1986 | Abed et al. | 369/44.14 |
| 4,633,471 | 12/1986 | Perera et al. | 369/44.14 |
| 4,638,377 | 1/1987 | Dakin | 369/44.14 |
| 4,643,522 | 2/1987 | Takashima | 369/44.14 |
| 4,644,516 | 2/1987 | Musha | 369/44.14 |
| 4,646,283 | 2/1987 | Ito et al. | 369/44.14 |
| 4,669,073 | 5/1987 | Wakabayashi et al. | 369/44.14 |
| 4,679,904 | 7/1987 | Kurihara | 369/44.14 |
| 4,682,246 | 7/1987 | Efron et al. | 369/44.15 |
| 4,688,204 | 8/1987 | Noyes, Jr. et al. | 369/44.14 |
| 4,694,447 | 9/1987 | Cohen et al. | 369/44.14 |
| 4,696,566 | 9/1987 | Sekimoto et al. | 369/44.14 |
| 4,697,167 | 9/1987 | O'Keeffe et al. | 369/44.14 |
| 4,701,898 | 10/1987 | Giddings | 369/44.14 |
| 4,702,555 | 10/1987 | Iguma et al. | 369/44.14 |
| 4,703,368 | 10/1987 | Dakin | 369/44.14 |
| 4,703,467 | 10/1987 | Elliott | 369/44.14 |
| 4,706,133 | 11/1987 | Giddings | 369/44.14 |
| 4,720,088 | 1/1988 | Tamura | 369/44.14 |
| 4,727,433 | 2/1988 | Dakin | 369/44.14 |
| 4,727,532 | 2/1988 | Giddings | 369/44.14 |
| 4,740,941 | 4/1988 | Shah et al. | 369/44.14 |
| 4,740,946 | 4/1988 | Yumura et al. | 369/44.14 |
| 4,746,991 | 5/1988 | Efron et al. | 369/44.14 |
| 4,751,692 | 6/1988 | Giddings | 369/44.14 |
| 4,755,884 | 7/1988 | Efron et al. | 369/44.14 |
| 4,757,393 | 7/1988 | Dakin | 369/44.14 |
| 4,763,314 | 8/1988 | McCaslin et al. | 369/44.14 |
| 4,764,915 | 8/1988 | Efron et al. | 369/44.14 |
| 4,769,803 | 9/1988 | Yammaiya | 369/44.14 |
| 4,774,699 | 9/1988 | Giddings | 369/44.14 |
| 4,786,999 | 11/1988 | Tanaka et al. | 369/44.14 |
| 4,791,622 | 12/1988 | Clay et al. | 369/44.14 |
| 4,792,875 | 12/1988 | Ohdaira | 369/44.14 |
| 4,794,586 | 12/1988 | Korth | 369/44.14 |
| 4,797,763 | 1/1989 | Levy et al. | 369/44.14 |
| 4,805,162 | 2/1989 | Stahl et al. | 369/44.14 |
| 4,809,247 | 2/1989 | Elliott | 369/44.14 |
| 4,811,320 | 3/1989 | Kawasaki et al. | 369/44.14 |
| 4,823,336 | 4/1989 | Inada et al. | 369/44.14 |
| 4,829,395 | 5/1989 | Coon et al. | 369/44.14 |
| 4,842,392 | 6/1989 | Nakamura et al. | 369/44.14 |
| 4,845,697 | 7/1989 | Giddings | 369/44.14 |
| 4,845,699 | 7/1989 | Kawasaki et al. | 369/44.14 |
| 4,853,811 | 8/1989 | Brooks, Jr. et al. | 369/44.14 |
| 4,868,694 | 9/1989 | Hagen | 369/44.14 |
| 4,882,644 | 11/1989 | Kimura et al. | 369/491 |
| 4,912,583 | 3/1990 | Hinlein | 369/44.14 |
| 4,942,563 | 7/1990 | Yamamuro | 369/44.14 |
| 4,953,959 | 9/1990 | Ishiwata et al. | 369/44.14 |
| 4,988,165 | 1/1991 | Ishii et al. | 369/44.14 |
| 4,998,011 | 3/1991 | Shuman | 369/44.14 |
| 5,001,568 | 3/1991 | Efron et al. | 369/44.14 |
| 5,003,526 | 3/1991 | Bailey | 369/44.14 |
| 5,044,729 | 9/1991 | Tomita et al. | 369/44.14 |
| 5,084,852 | 1/1992 | Bailey | 369/44.14 |
| 5,103,438 | 4/1992 | Masunaga et al. | 369/44.14 |
| 5,126,990 | 6/1992 | Efron et al. | 369/44.14 |
| 5,136,558 | 8/1992 | Getreuer et al. | 369/44.14 |
| 5,138,605 | 8/1992 | Shtipelman et al. | 369/44.14 |
| 5,150,343 | 9/1992 | Goto et al. | 369/44.17 |
| 5,155,633 | 10/1992 | Grove et al. | 369/44.14 |
| 5,177,640 | 1/1993 | Grassens | 369/44.14 |
| 5,187,702 | 2/1993 | Takahashi | 369/44.15 |
| 5,191,570 | 3/1993 | Shirai | 369/44.22 |
| 5,245,174 | 9/1993 | Prikryl et al. | 369/44.14 |
| 5,253,244 | 10/1993 | Bailey | 369/44.14 |
| 5,268,800 | 12/1993 | Nielsen | 369/44.14 |
| 5,291,110 | 3/1994 | Andrews, Jr. et al. | 369/44.14 |
| 5,313,332 | 5/1994 | Schell et al. | 369/44.14 |
| 5,317,143 | 5/1994 | Yoshimoto et al. | 369/44.14 |
| 5,319,624 | 6/1994 | Yamasaki et al. | 369/44.14 |
| 5,321,680 | 6/1994 | Bailey | 369/44.14 |
| 5,331,622 | 7/1994 | Ernst et al. | 369/44.14 |
| 5,347,500 | 9/1994 | Eguchi | 369/44.14 |
| 5,349,175 | 9/1994 | Prikryl | 369/44.14 |
| 5,373,490 | 12/1994 | Bailey | 369/44.14 |
| 5,375,116 | 12/1994 | Bailey | 369/44.15 |

| | | | |
|---|---|---|---|
| 5,398,222 | 3/1995 | Kim | 369/44.14 |
| 5,448,545 | 9/1995 | Bailey | 369/44.12 |
| 5,459,624 | 10/1995 | Erickson et al. | 369/44.14 |
| 5,479,390 | 12/1995 | Bailey | 369/44.14 |

OTHER PUBLICATIONS

Takashi Maeda et al., *Read Channel and Format for High–Density Magneto–Optical Disk System,* Jpn. J. Appl. Phys. Nov. 1993, vol. 32, pp. 5335–5341.

T. Maeda et al., *Write Control Method for High Density Magneto–optical Disk System,* IEEE Transactions on Magnetics, vol. 29 No. 6 Nov. 1993, pp. 3787–3789.

Hartmann, M., "Erasable Magneto–Optical Recording Media", iIEEE Transactions on Magnetics, vol. Mag–20, No. 5, Sep. 1984, pp. 1013–1018.

Sander, I., "Digital Magneto–Optic Storage System", Topical Meeting on Optica Data Storage, Jan. 20, 1989, pp. tha2–1–Tha2–4.

Murakami, et al., "Magnetoopic errasable disk memory with two optical heads", Applied Optics, vol. 25, No. 22, Nov. 15, 1986, pp. 3986–3989.

Yoshizumi, Keiichi, et al., Fast Access Actuator for Optical Disk Memory, SPIE, 1985.

G. Bouwhuis, et al., Principals of Optical Disc Systems, Adam Hilger Ltd., Bristol, pp. 70–80.

Kobori, et al., "New Magneto–Optic Head with a Buitlt–In Generator for a Bias Magnetic Field", Optical Data Storage Conference, Technical Digest Series vol. 10, Mar. 11–13, 1987, pp. 186–189.

Hiromichi Kobori et al., "New magnetooptic head with a built–in generator for a bias magnetic field" Applid Optics/ vol. 27, No. 4/ Feb. 15, 1988, pp. 698–702.

Eguchi, Naoya, et al., *An 86 mm Magneto–Optical Disk Drive with a Compact and fast–seek–time Optical head,* SPIE vol. 1316 Optical data storage (1990), pp. 2–10.

T. Maeda, et al., *Read Channel and Format for High Density Magneto–Optical Disk System,* Joint International Symposium, 1993 IEEE Catalog #93TH0548–8, pp. 50,60.

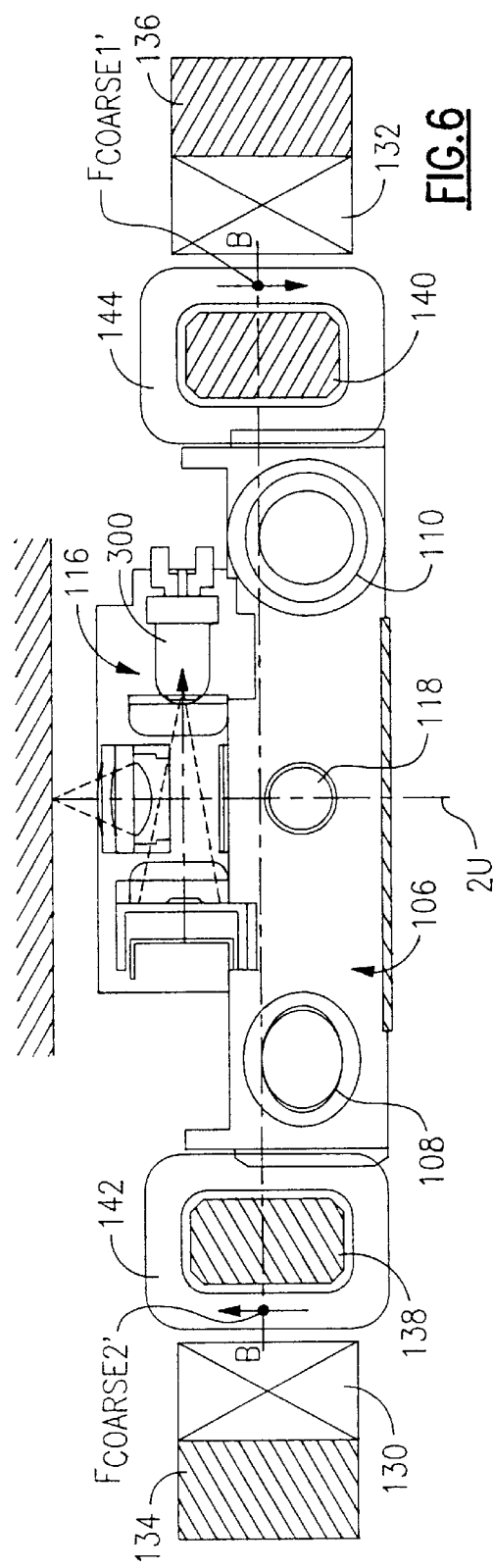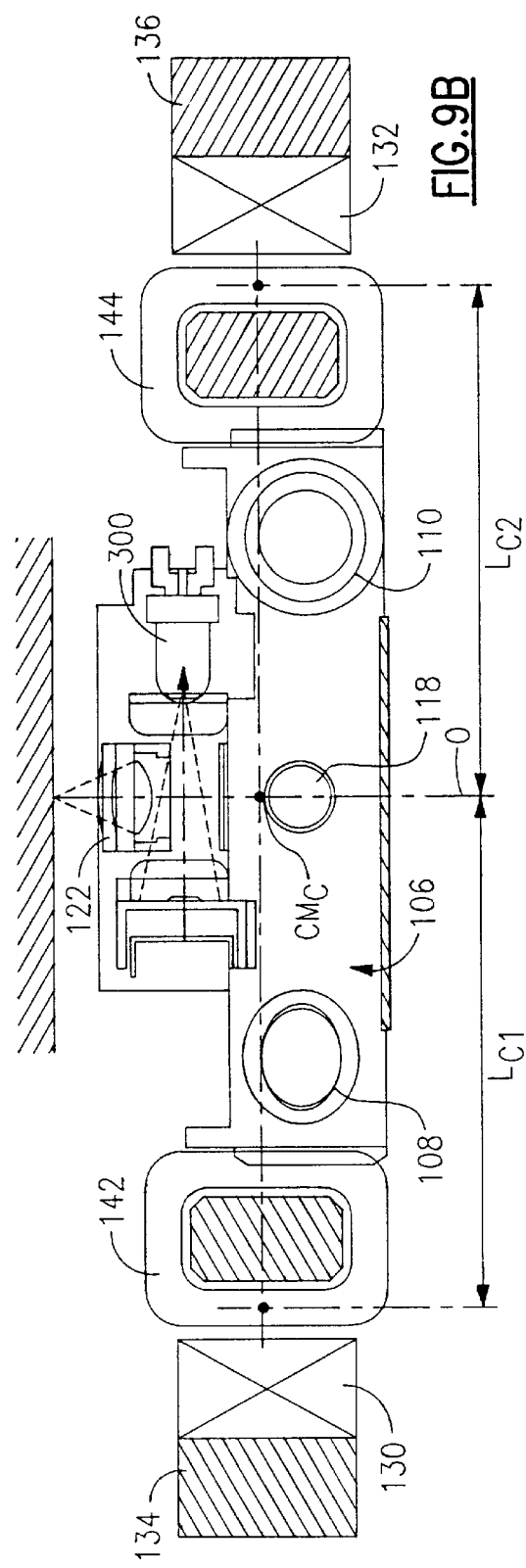

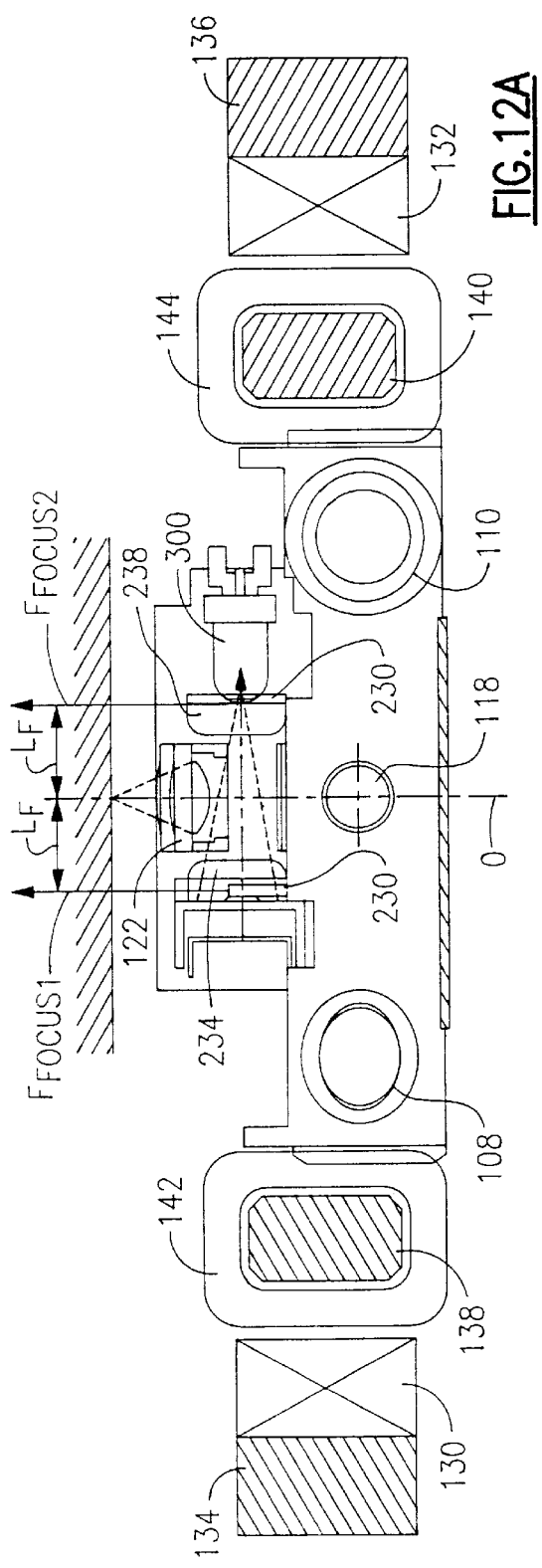
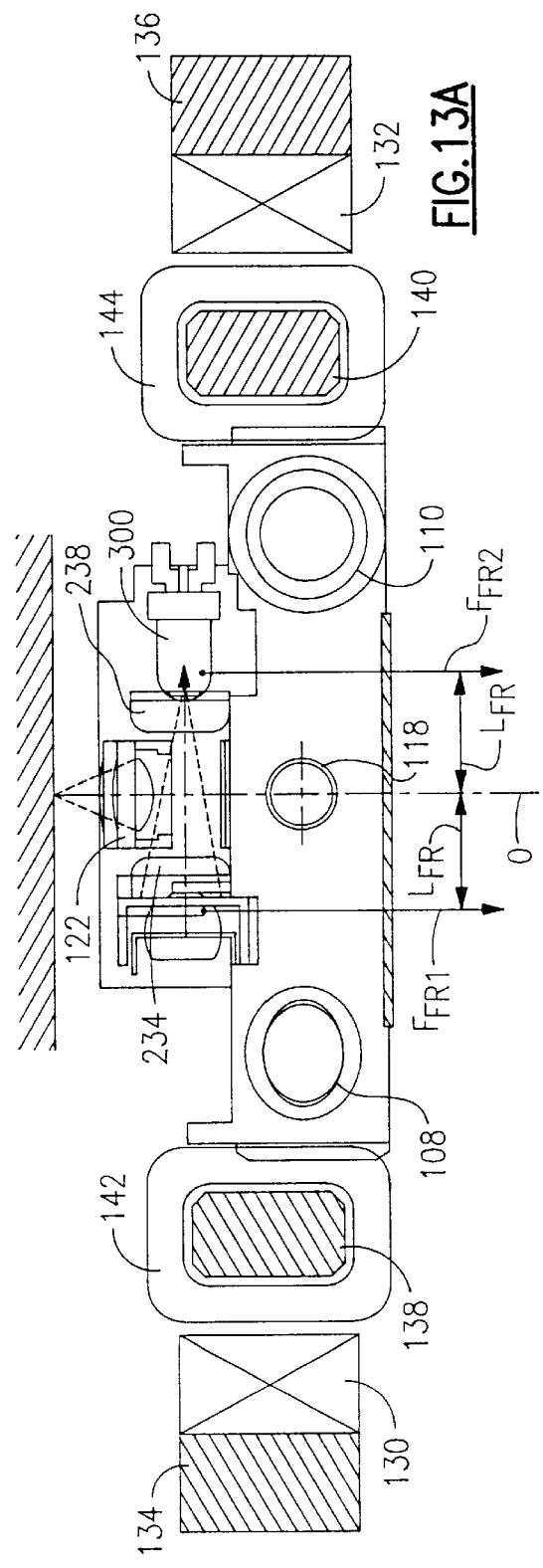

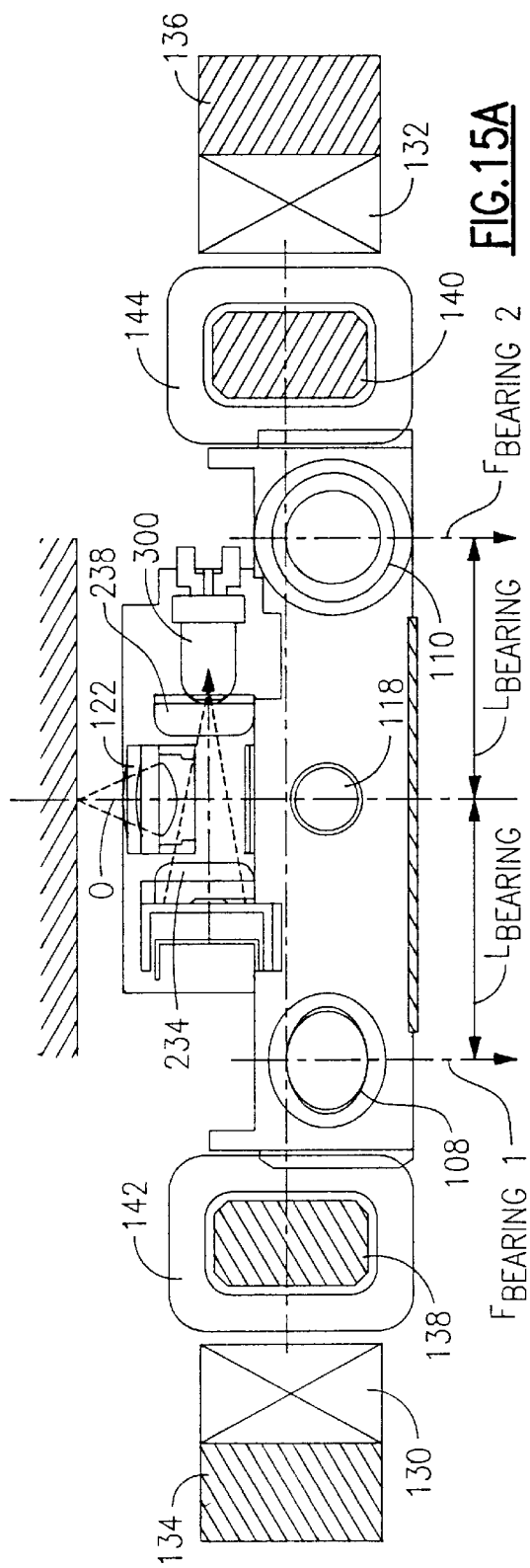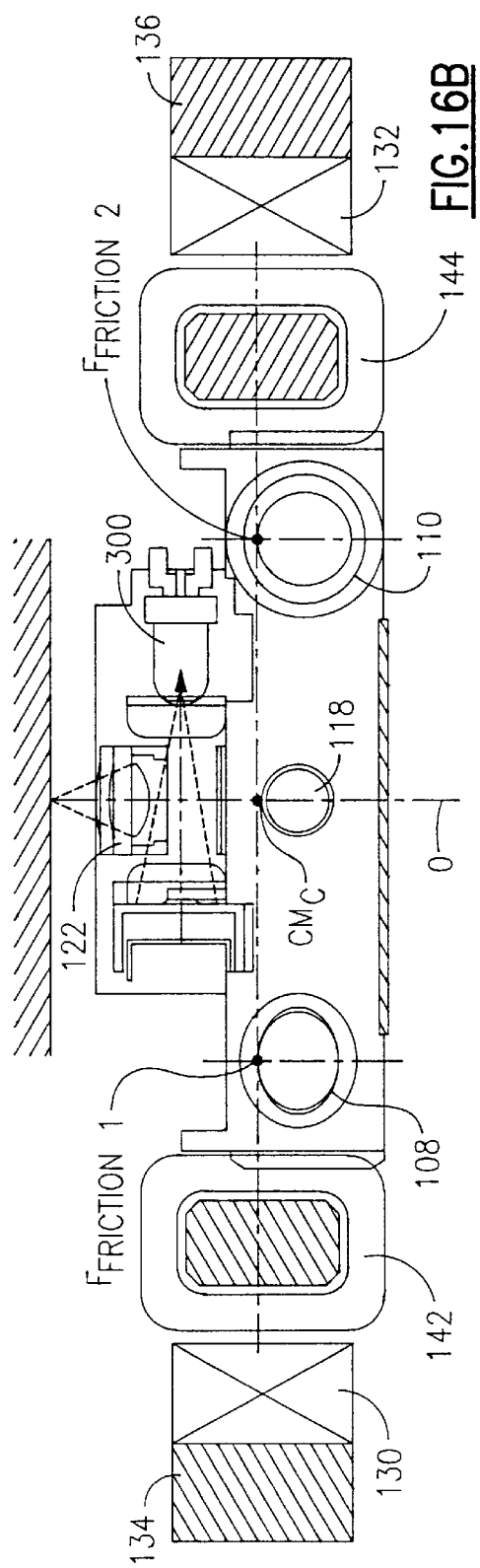

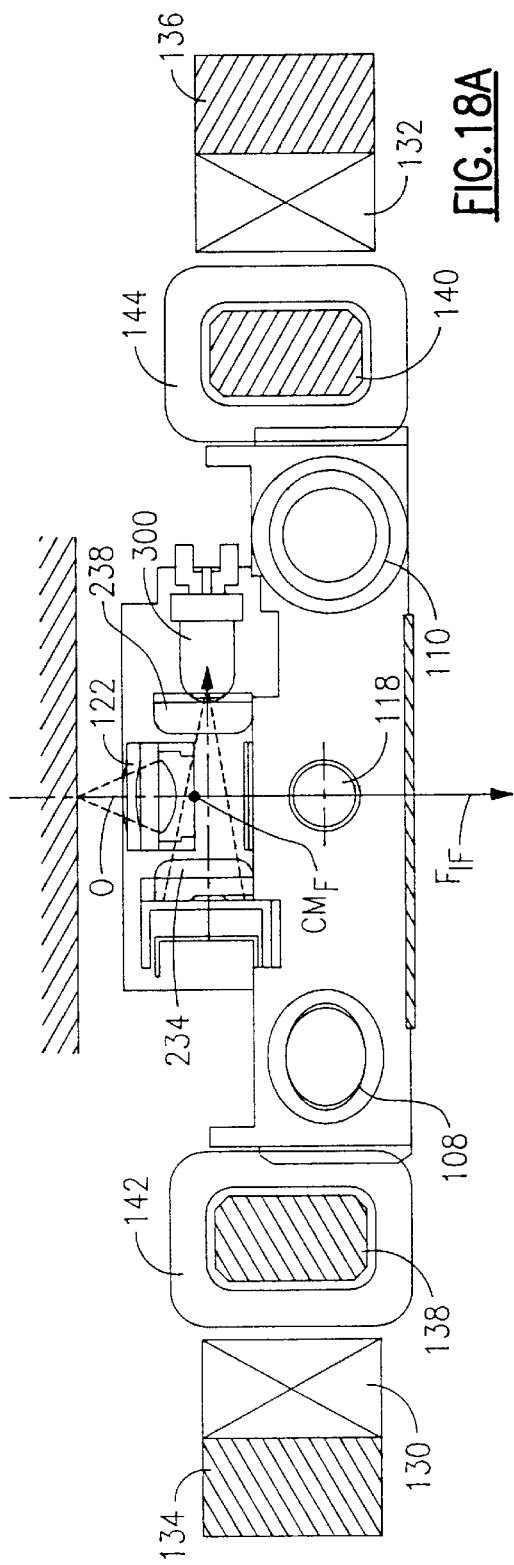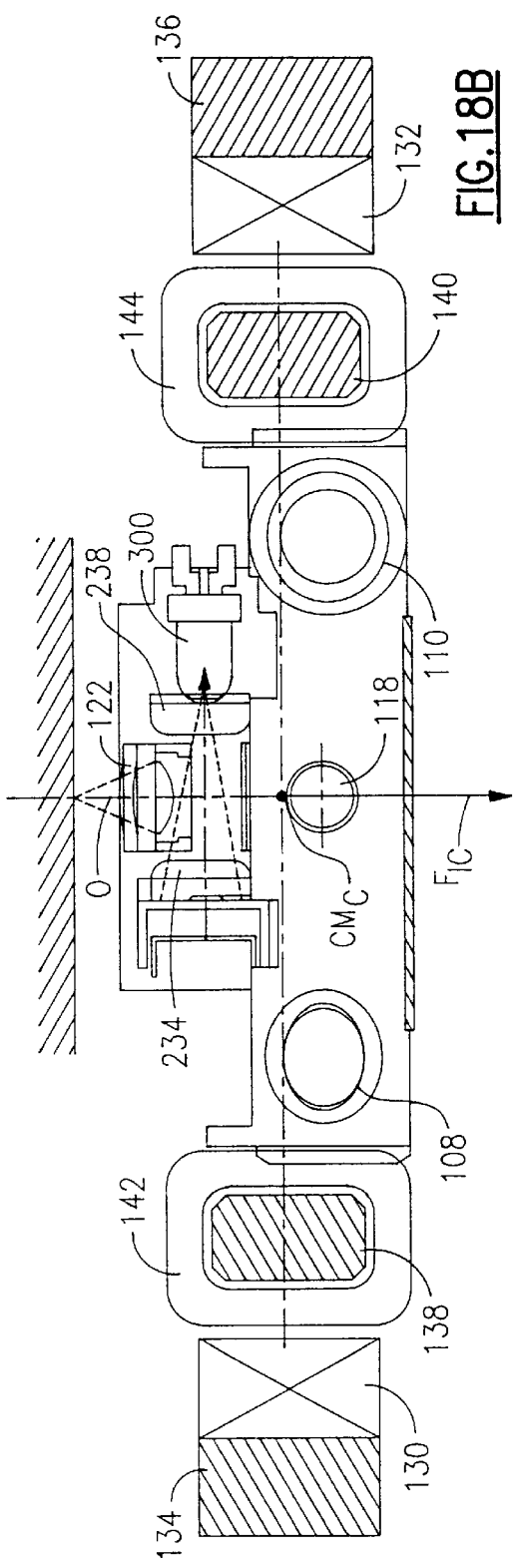

SEEK ACTUATOR FOR OPTICAL RECORDING

CROSS REFERENCE TO RELATED APPLICATIONS

This is a continuation-in-part of U.S. patent application Ser. No. 08/105,866, now abandoned filed Aug. 11, 1993, which is a continuation of U.S. patent application Ser. No. 07/657,155 filed Feb. 15, 1991, now U.S. Pat. No. 5,265,079.

BACKGROUND OF THE INVENTION

1. Field of the Invention

The invention relates to optical disc recording systems and, in particular, to an electromagnetic carriage and actuator assembly for focusing, tracking, and random access in optical disc players and recorders.

2. Description of the Related Art

Optical data storage systems that utilize a focused laser beam to record and instantaneously playback information are very attractive in the computer mass storage industry. Such optical data storage systems offer very high data rates with very high storage density and rapid random access to the data stored on the information medium, most commonly an optical disc. In these types of optical disc memory systems, reading and writing data is often accomplished by using a single laser source functioning at two respective intensities. During either operation, light from the laser source passes through an objective lens which converges the light beam to a specific focal point on the optical disc. During data retrieval, the laser light is focused on the recording medium and is altered by the information of the data storage medium. This light is then reflected off the disc, back through the objective lens, to a photo detector. It is this reflected signal that transmits the recorded information. It is thus especially important that, when information is being written to or read from the memory, the objective lens and the exiting focused beam be precisely focused at the center of the correct track so that the information may be accurately written and retrieved.

To attain a precise reading of the information stored on the disc, it is necessary to be able to move the objective lens in both a focusing or Z direction (i.e., perpendicular to the plane of the disc) in order to focus the laser beam to a small point of light on a precise location of the disc to write or retrieve information, and in a tracking or Y direction (i.e., radial direction) to position the beam over the exact center of the desired information track on the disc. Focus and tracking corrections may be effected by moving the objective lens in either the direction of the optical axis of the lens for focusing, or in a direction perpendicular to the optical axis for tracking.

In these systems, the position of the objective lens in the focus and tracking directions is commonly adjusted by control systems. Actuators support the objective lens and convert position correction signals from the feedback control systems into movement of the objective lens. As will be appreciated, failure to focus the light on a small enough area of the medium will result in too large a portion of the disc being used to store a given amount of information, or in too broad of an area of the disc being read. Likewise, the failure to precisely control the tracking of the laser light will result in the information being stored in the wrong location, or in information from the wrong location being read.

In addition to translation along the Z axis to effect focusing, and translation along the Y axis to effect tracking, there are at least four additional motion modes for the actuator, each of which reduces the accuracy of the reading and writing operations and is thus undesirable during normal operation of the system. These undesirable modes of motion are rotation about the X axis (an axis orthogonal to both the Y direction and the Z direction), or pitch; rotation about the Z axis, referred to as yaw; rotation about the Y axis, called roll; and linear motion along the X axis, or tangential translation. Motion in these directions is often caused by motor and reaction forces acting on the carriage and/or actuator. These modes typically produce undesired movement during tracking or focusing operations which subsequently affects the alignment of the objective lens relative to the optical disc.

SUMMARY OF THE INVENTION

The present invention overcomes the drawbacks of the prior art devices by providing an apparatus for optical reading or recording information on an optical information medium, wherein as a result of the relative position of the components of the apparatus and the magnitude and application points of the forces exerted to track and focus, the objective lens through which information is read from the information medium prevents the objective lens from being affected by most resonances, motor forces and reaction forces. This is critical because in optical recording, displacements of 0.02 micrometers can easily be picked up.

Specifically, one aspect of the invention is an apparatus for optically reading or recording information on an optical disk which is rotatable about an axis of rotation, wherein the apparatus includes a frame, a carriage, a carriage drive, an objective lens, an objective lens holder and a focus drive. The carriage drive (i.e., those portions of the carriage motor which move relative to the frame) drives the carriage along a path radial to the axis of the rotation. The objective lens is mounted on the objective lens holder so that the optical axis of the objective lens is within 0.5 millimeters of intersecting the center of mass of the carriage mass. The holder is movable relative to the carriage so as to move the objective lens along its optical axis. This movement is controlled by a focus drive (i.e., those portions of the focus motor which move relative to the carriage) which drives the holder so as to move the objective lens along its optical axis. For purposes of this application including the appended claims, the carriage and actuator assembly is considered to be broken down into two mass groupings. The first is the "fine motor mass". This includes the mass of all components suspended for freedom of movement from the carriage. The second is the "carriage mass" which includes the mass of all components which move with the carriage excluding the fine motor mass and any incidental connecting wiring not wholly supported by the carriage.

Another aspect of the invention is an apparatus for optically reading or recording information on an optical disk which is rotatable about an axis of rotation, wherein the apparatus includes a fine tracking drive (i.e., those portions of the fine tracking motor which move relative to the carriage) for driving the objective lens holder so as to make fine adjustments in the relative position of the objective lens along a path radial to the axis of rotation of the optical disk. The fine motor mass has a center of mass within 0.5 millimeters of a line parallel to the optical axis containing the center of mass of the carriage mass.

Another aspect of the invention is an apparatus for optically reading or recording information on an optical disk which is rotatable about an axis of rotation, wherein the apparatus includes a frame, a carriage, a carriage drive, an objective lens, an objective lens holder, a focus drive, and a fine tracking drive, wherein the carriage mass and the fine motor mass each have a center of mass within 0.5 millimeters of the optical axis. Preferably, the carriage mass and the fine motor mass have respective centers of gravity within 0.5 mm of one another.

Another aspect of the present invention is an apparatus for optically reading or recording information on an optical disk which is rotatable about an axis of rotation having a frame, a carriage, a carriage drive, an objective lens, an objective lens holder, a focus drive and a fine tracking drive, wherein the net center of force exerted by the fine tracking drive is less than 0.2 mm from the optical axis. Another aspect of the invention is an apparatus for optically reading or recording information on an optical disk having a frame, a carriage, a carriage drive, an objective lens, an objective lens holder, a focus drive, and a fine tracking drive, wherein the center of force exerted by the coarse tracking drive is less than 0.2 mm from said optical axis.

Yet another aspect of the invention is an apparatus for optically reading or recording information on an optical disk having a frame, a carriage, a carriage drive, an objective lens, an objective lens holder, a focus drive, and a fine tracking drive, wherein the carriage drive exerts a pair of forces on the carriage to drive the carriage along a radial path and the distance between the center of mass of the carriage and the point upon which one of the forces acts is within 0.2 millimeters of the distance between the center of mass of the carriage and the point upon which the other carriage drive force acts.

In still another aspect of the invention an assembly for controlling the position of a lens in an optical data storage and retrieval drive includes a carriage that suspends a lens holder using a plurality of flexures. A lens is mounted in the lens holder such that the center of mass of the suspended lens holder lies on the optical axis of the lens, and also coincides with the center of mass of the lens. The lens holder is capable of relative motion with respect to the carriage with at least one degree of freedom. The center of mass of the carriage lies within 0.1 mm of the optical axis, proximate the center of mass of the lens holder. Suspensory forces acting on the lens holder are symmetric about the optical axis. A coarse magnetic drive moves the carriage in a tracking direction, and exerts forces on the carriage that are balanced and symmetric about the optical axis, so that moments about the center of mass of the carriage are effectively absent. Inertial forces acting on the carriage, and forces reactive to the magnetic drive forces are also balanced and symmetric with respect to the optical axis, and produce insubstantial moments about the center of mass of the carriage. There are fine tracking and focusing drives for the lens holder. Both of these drives produce balanced and symmetric forces about the optical axis, such that moments about the optical axis are absent. Inertial forces and reactive forces acting on the suspended lens holder are also symmetric about the optical axis. As a result the objective lens moves along its optical axis, and in its tracking direction without change in attitude, and its focal point can be precisely controlled with respect to the surface of a storage medium being read or written.

BRIEF DESCRIPTION OF THE DRAWING

FIG. 6 is a side schematic view further illustrating the coarse tracking forces;

FIG. 9B is a schematic side view illustrating the symmetry of coarse tracking forces in the vertical plane;

FIG. 12A is a schematic side view illustrating the symmetry of focus forces in the horizontal plane;

FIG. 13A is a schematic side view which illustrates the symmetry of focus reaction forces in the horizontal plane;

FIG. 15A is a schematic side view which illustrates the symmetry of carriage suspension forces in the horizontal plane;

FIG. 16B is a schematic side view illustrating the alignment of the friction forces with the center of mass of the carriage;

FIG. 18A is a schematic side view illustrating the alignment of the net inertial force of the fine motor with the optical axis of the objective lens;

FIG. 18B is a schematic side view illustrating the alignment of the net inertial force of the carriage with the optical axis of the objective lens;

DETAILED DESCRIPTION OF THE PREFERRED EMBODIMENTS

Figure 1:
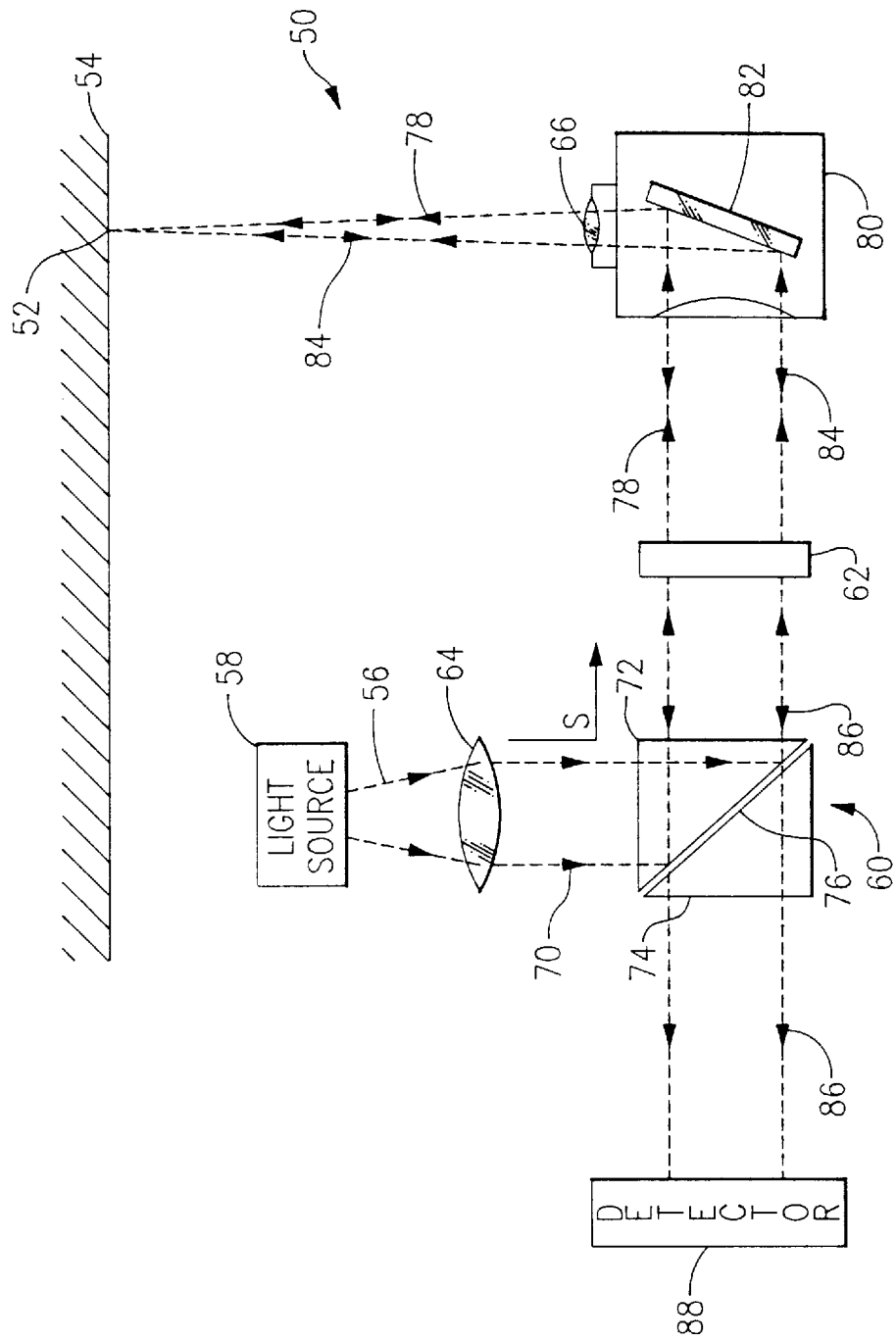
FIG. 1 schematically illustrates an exemplary optical read/write system in which the carriage and actuator assembly of the present invention may be used.

FIG. 1 schematically illustrates the operation of an exemplary optical read/write system 50 in reading data from a precise location 52 on an information storage medium, such as an optical disc 54. While the system 50 illustrated is a write-once or WORM system, those skilled in the art will recognize that the carriage and actuator assembly of the present invention could also be used in magneto-optical erasable systems. Information is transmitted to and read from the disc 54 utilizing a light beam 56 produced by a light source 58 which passes through a plurality of components including a cube-shaped beamsplitter 60 which separates the light beam 56 according to its polarization, a quarter wave plate 62 which changes the polarization of the light beam 56, a collimator lens 64, and an objective lens 66, which, in combination, direct the light beam 56 toward the desired location 52 on the disc 54.

In operation, the light source element 58, typically a laser diode, emits the light beam 56 toward the convex collimator lens 64. The collimator lens 64 converts this source beam 56 into a parallel, linearly S polarized light beam 70 and conducts the beam 70 toward the beamsplitter 60. This cube-shaped beamsplitter 60 is formed by attaching two right angle prisms 72 and 74 along their respective hypotenuses and includes a polarization sensitive coating forming a beamsplitting interface 76 between the two hypotenuses. The beamsplitter 60 separates and/or combines light beams of differing polarization states, namely linear S polarization and linear P polarization. Separation is accomplished in conjunction with the polarization sensitive coating which transmits linearly P polarized light beams and reflects linearly polarized S light beams. Light exiting the beamsplitter 60 passes through the quarter wave plate 62 which converts the linearly polarized light beam 70 to a circularly polarized light beam 78. Upon exiting the quarter wave plate 62, the circularly polarized beam 78 enters an actuator 80.

The actuator 80 includes a mirror 82 which orthogonally reflects the light beam 78 upward toward the objective lens 66. The objective lens 66 converges the circularly polarized beam 78 to the precise focal point 52 on surface of the optical disc 54. Upon striking the disc 54, the circularly polarized light beam 78 is altered by the information stored on the disc 54 and is reflected as a divergent circularly polarized light beam 84 carrying information identical to that encoded on the disc 54. This reflected circularly polarized light beam 84 re-enters the objective lens 66 where it is collimated. The light beam 84 is again reflected from the mirror 82 and re-enters the quarter wave plate 62. Upon exiting the quarter wave plate 62, the circularly polarized beam 84 is converted to a linearly P polarized light beam 86. As linearly P polarized light beams are transmitted through the beamsplitter 60 without reflection at the splitting interface, this light beam 86 continues to a photodetector 88 which detects the data stored on the disc 54. In addition, if the light beam 86 falling on the photo detector 88 is out of focus or misaligned, the amount of misalignment or defocusing is measured electronically and used as feedback for a servo system (not shown) which properly realigns the objective lens 66.

Figure 2:
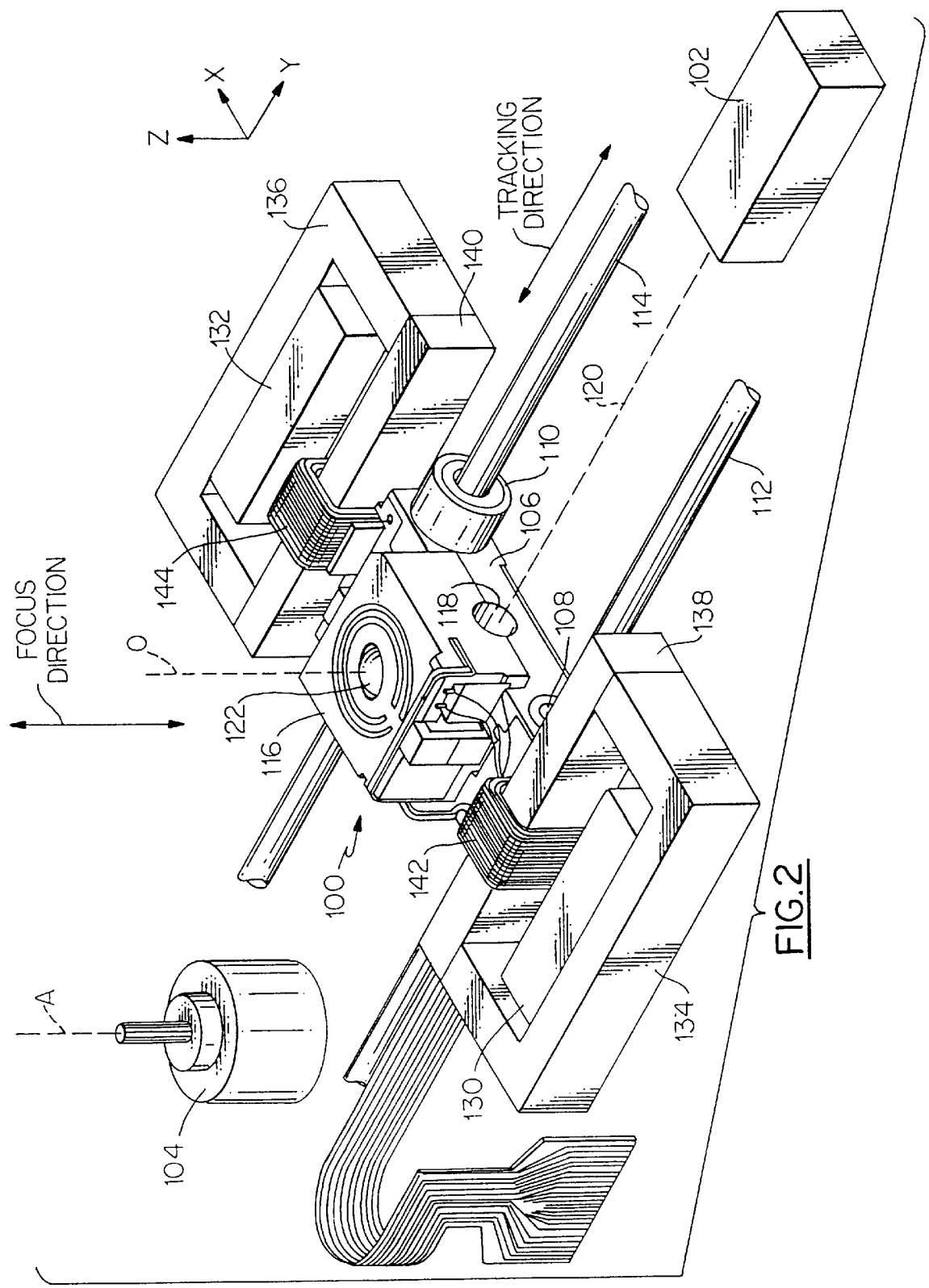
FIG. 2 is a perspective view of the carriage and actuator assembly.

FIG. 2 illustrates an electromagnetic carriage and actuator assembly 100 constructed in accordance with the present invention. The assembly 100 can be used with an optics module 102 to read and write data onto the surface of an optical disc as described above in connection with FIG. 1, wherein the light source 58, detector 88, collimating lens 64, quarter wave plate 62, and beamsplitter 60 are all incorporated within the module 102. A spindle motor 104 is located adjacent the assembly 100 and rotates an optical disc (not shown) about an axis of rotation A above the assembly 100. The assembly 100 includes a carriage 106 having first and second bearing surfaces 108 and 110, respectively, slidably mounted on first and second guide rails 112 and 114, respectively, and an actuator 116 which is mounted on the carriage 106. As will be appreciated, the rails 112 and 114 provide a frame along which the carriage 106 moves. A beam of light 120 emitted from the light source 58 in the optics module 102 enters the actuator 116 through a circular aperture 118 and is reflected by a mirror contained inside the actuator through an objective lens 122 defining an optical axis O to the surface of the disc. As will be appreciated, the axis of rotation A of the disc is parallel to the optical axis O of the objective lens 122.

The carriage 106 and actuator 116 carried thereon are moved horizontally along the rails 112 and 114 in a tracking direction by a coarse tracking motor to access various information tracks on the surface of the disc. The tracking motor includes two permanent magnets 130 and 132 wherein each magnet is attached to a corresponding C-shaped outer pole piece 134, 136, respectively. Two inner pole pieces 138 and 140 are respectively positioned across the ends of the outer pole pieces 134 and 136 so as to form a rectangular box around the permanent magnets 130, 132. Two coarse coils 142 and 144 of equal length are respectively affixed to the bearing surfaces 108, 110 and surround the inner pole pieces 138, 140 with sufficient clearance to move over the pole pieces 138, 140 when the carriage 106 is moved in the tracking direction. In this embodiment, the coarse coils 142 and 144 are the only portion of the course tracking motor that are movable. As will be described in more detail below, the actuator 116 can also move the objective lens 122 closer to or further away from the disc, thereby focusing the exiting light beam 120 upon the desired location on the surface of the disc.

Figure 3:
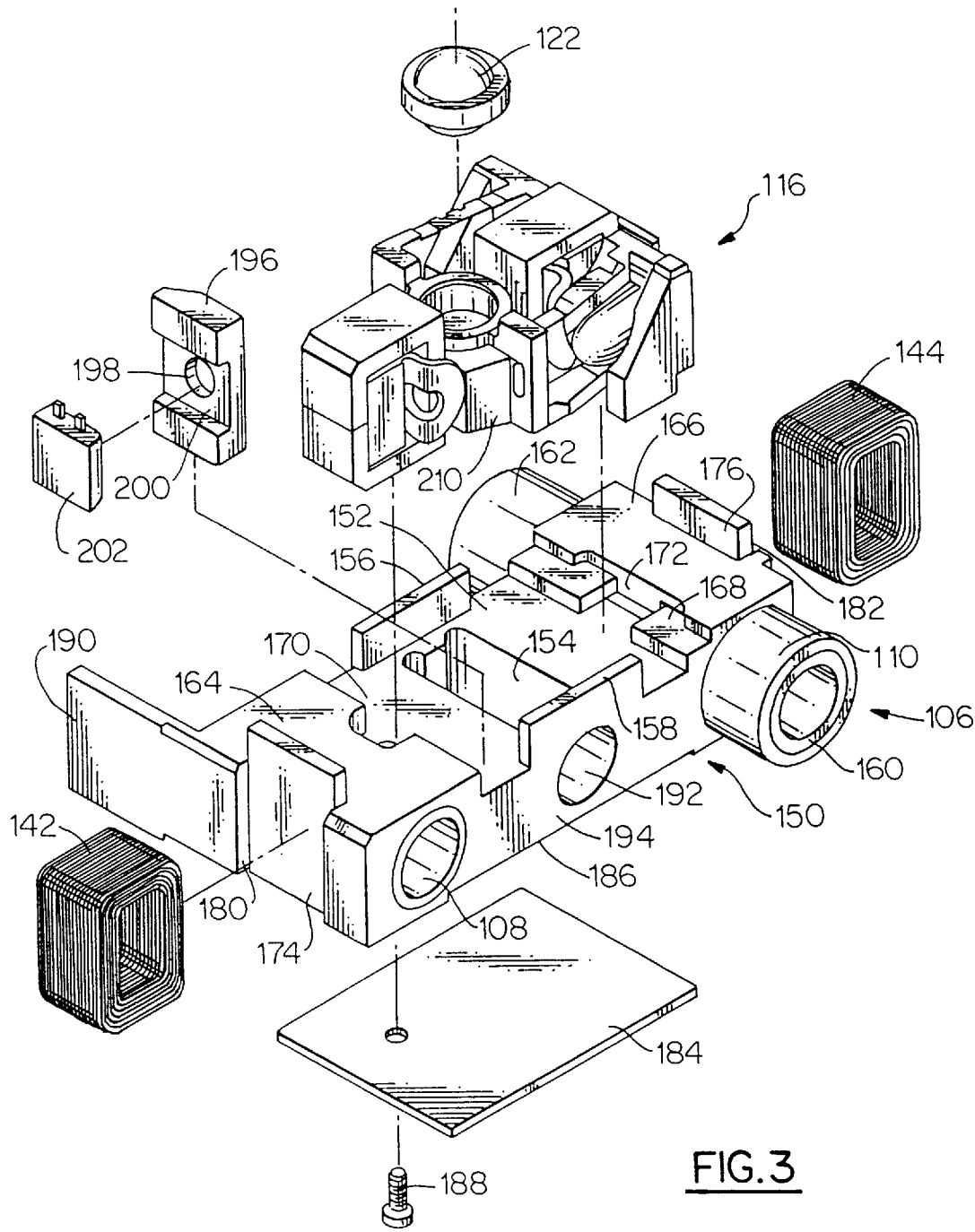
FIG. 3 is an exploded view of the carriage and actuator assembly.

FIG. 3 is an exploded view illustrating the carriage 106 and actuator 116 in greater detail. The carriage 106 includes a generally rectangular base 150 to which the actuator 116 is attached. The base 150 has a substantially flat top surface 152 having a generally rectangular chamber 154 formed therein. The first bearing surface 108 is cylindrical in shape, while the second bearing surface 110 consists of two elliptical bearing sections 160 and 162 of approximately equal length which meet inside the base 150. The spacing of the rails 112 and 114 relative to the optical axis O is selected such that each bearing surface 108 and 110 is subjected to the same amount of preload. The bearing surfaces 108 and 110 are further designed such that both surfaces have substantially the same amount of surface area contacting the rails 112 and 114. The length of the bearing sections comprising the second bearing surface is approximately equal to the length of the first bearing surface, although minor variations in length may be necessary to account for wear. Two vertical walls 156 and 158 extend upwardly from the top surface 152 of the base 150 adjacent the ends of the chamber 154. The base 150 further includes two platform regions 164 and 166 formed at the ends of the base 150 above the bearing surfaces 108 and 110. A step 168 joins the top surface 152 of the base 150 with the second platform region 166. A first U-shaped notch 170 is formed in the first platform region 164, and a second U-shaped notch 172 is formed in the second platform region 166 and step 168.

The coarse coils 142 and 144 are respectively attached to two vertical plates 174 and 176. The plates 174 and 176 are respectively positioned in notches 180 and 182 formed in the ends of the base 150. The base 150 further includes a mass balancing plate 184 which is attached to a bottom surface 186 of the base 150 via a screw 188, and a mass balancing projection 190 which extends outwardly from the base 150 adjacent the first coarse coil 142. A circular aperture 192 is formed in a front side 194 of the base 150 and receives the light beam 120 emitted from the optics module 102 shown in FIG. 2. A bracket 196 having a circular aperture 198 therein is positioned between the second vertical wall 158 and the first platform region 164 along the front side 194 of the base 150. The bracket 196 additionally includes a notch 200 which receives a photo detector 202 such that the photodetector 202 is positioned between the bracket 196 and the first platform region 164.

The actuator 116, often referred to as a "2-D" actuator for 2 degrees of motion, i.e. focusing and tracking, is mounted on the base 150 between the vertical walls 156, 158 and the platform regions 164, 166. A prism (not shown) is positioned within the chamber 154 in the base 150 to deflect the light beam 120 emitted from the optics module 102 such that the beam 120 exits the actuator 116 through the objective lens 122. The objective lens 122 is positioned within a lens holder 210 attached to a focus and fine tracking motor which moves the lens 122 so as to precisely align and focus the exiting beam 120 upon a desired location on the surface of the optical disc. The objective lens 122 defines an optical axis O which extends vertically through the center of the lens.

Figure 4:
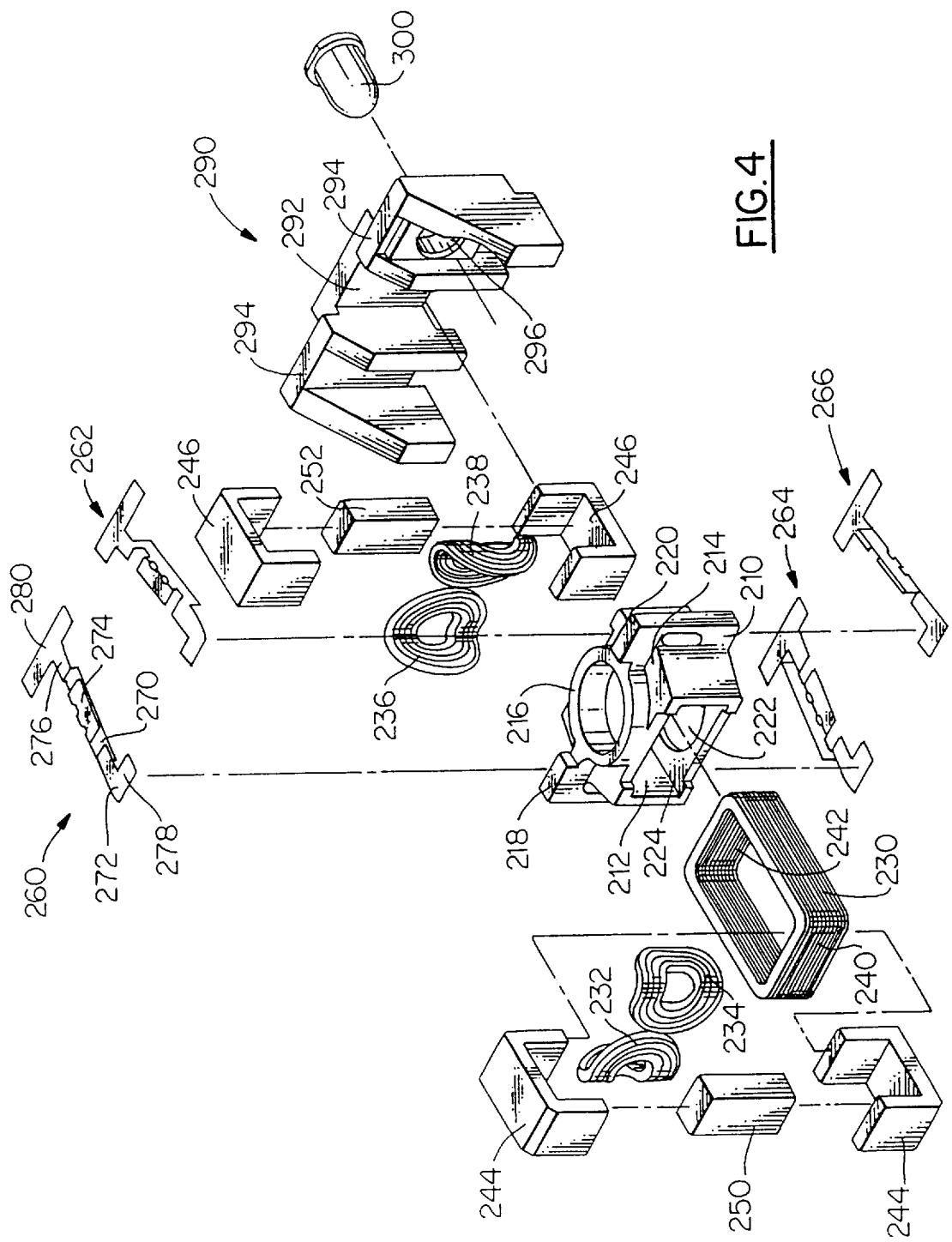
FIG. 4 is an exploded view of the actuator.

The components of the actuator 116 are best seen in FIG. 4. The lens holder 210 is generally rectangular in shape and includes a generally rectangular opening 212 formed therethrough. A top surface 214 of the lens holder 210 includes a circular collar 216 positioned between two shoulders 218, 220. A circular aperture 222 having a diameter substantially equal to that of the collar 216 is formed in a bottom surface 224 of the lens holder. A rectangular focus coil 230 is positioned within the rectangular opening 212 in the lens holder 210. Two oval-shaped, fine tracking coils 232, 234, are positioned at the corners of a first end 240 of the focus coil 230, and two more identical tracking coils 236, 238 are positioned at the corners of a second end 242 of the focus coil 230. A first pair of U-shaped pole pieces 244 is positioned to surround the first end 240 of the focus coil 230 and tracking coils 232, 234 attached thereto, while a second pair of U-shaped pole pieces 246 surrounds the second end 242 of the focus coil 230 and tracking coils 236, 238 attached thereto. In addition, two permanent magnets 250, 252 are positioned between the pole piece pairs 244, 246, adjacent the tracking coils 232, 234 and 236, 238 respectively.

Two top flexure arms 260, 262 are attached to the top surface 214 of the lens holder 210 while two additional bottom flexure arms 264, 266 are attached to a bottom surface of the lens holder 210. Each flexure arm preferably consists of a thin sheet of etched or stamped metal (typically steel or beryllium copper) with a thickness on the order of 25 micrometers to 75 micrometers. For simplicity, only the flexure arm 260 will be described. It should be noted, however, that the remaining flexure arms 262, 264, and 266 are of identical structure. The flexure arm 260 includes a first vertical section 270 attached to first, second, and third horizontal sections 272, 274, and 276. The third horizontal section 276 is further attached to a perpendicular crossbar 280. The first horizontal section includes a shoulder 278 which attaches to the corresponding shoulder 218 on the lens holder 210. Further, the shoulder of the second top flexure arm 262 attaches to the corresponding shoulder 220, while the shoulders of the bottom flexure arms 264 and 266 attach to similar structures on the bottom surface of the lens holder 210.

The flexures 260, 262, 264, and 266 are further attached to a support member 290. The support member 290 includes a central notch 292 which receives the second pair of pole pieces 246. A ledge 294 is formed on each side of the notch 292 on the top and bottom surfaces of the support member 290. The crossbar sections 280 of the flexure arms 260, 262 are attached to these ledges 294, while flexure arms 264, 266 are connected to corresponding ledges on the bottom of the support member 290 so as to cooperatively suspend the lens holder 210 from the support member 290. The support member 290 further includes an aperture 296 for receiving a light emitting diode 300. The diode 300 is in alignment with the aperture 198 in the bracket 196, FIG. 3, and photodetector 202 positioned within the notch 200 in the bracket, such that when the light emitting diode 300 is energized, substantially collimated light is emitted through the aperture 198 in the bracket 196 and is incident upon the photodetector 202. Depending on the position of the lens holder 210 with respect to the support member 290, light emitted by the diode 300 will fall onto various portions of the detector 202. By analyzing the amount of light incident upon the detector 202, a position correction signal can be generated to determine the amount of displacement required for precise focusing and tracking at the desired location on the surface of the disc.

In the illustrated embodiment, the fine motor mass consists of the lens holder 210, the objective lens 122, the focus coil 230, and the fine tracking coils 232, 234, 236 and 238. The carriage mass consists of the base 150, course tracking coils 142 and 144, the bracket 196, and photodetector 202, the support member 290, the vertical plates 174 and 176, the mass balancing plate 184 and screw 188, the permanent magnets 250 and 252, the pole pieces 244 and 246, and the bearing surfaces 108 and 110.

With reference to the above description in connection with FIGS. 3 and 4, the coarse tracking coils 142, 144 have equal dimensions and are symmetric about optical axis O of the objective lens. Further, the tracking coil pairs 232, 234 and 236, 238 have equal dimensions and are symmetric about optical axis O of the lens 122. The dimensions of the mass balance plate 184 and mass balance projection 184 are advantageously selected to compensate for the mass of the support member 290, flexures 260, 262, 264, 266, bearing surfaces 108, 110, bracket 196 and photodetector 202, such that the center of mass of the carriage and the center of mass of the fine and focus drives (consisting of the pole pieces 244, 246, the permanent magnets 250, 252, the focus coil 230, and tracking coils 232, 234, 236, 238) are generally intersected by the optical axis O of the lens 122. As will be described in more detail below, alignment of these centers of gravity with the optical axis O of the lens 122, and the symmetry of the motor forces and reaction forces acting on the carriage 106 and actuator 116 ensure that undesirable modes of motion which adversely affect position of the objective lens 122 are minimized.

Figure 5:
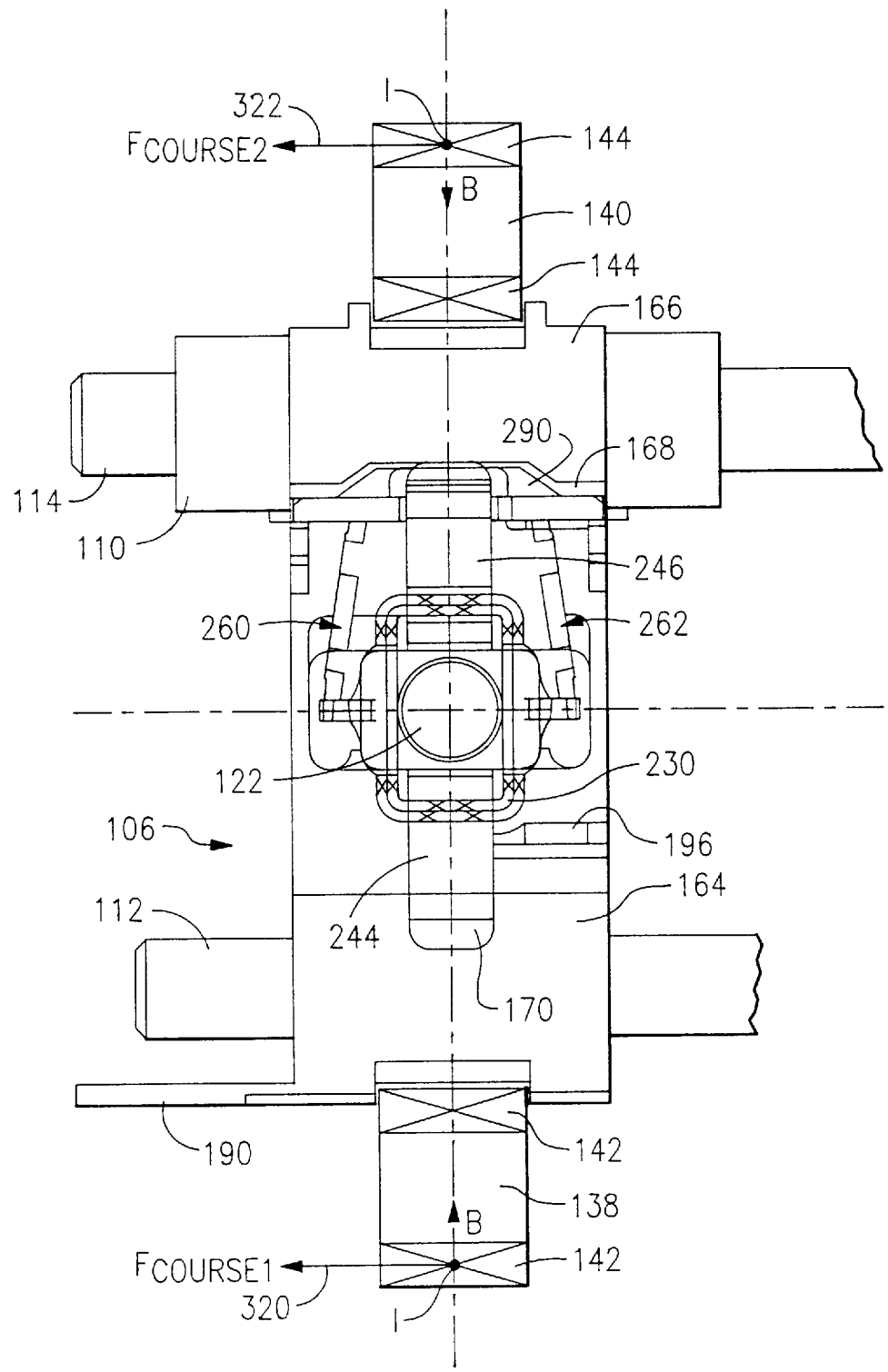
FIG. 5 is a schematic top view illustrating the coarse tracking forces acting on the assembly.

Referring to FIG. 5, the permanent magnets 130, 132 adjacent the coarse tracking coils 142, 144 generate a magnetic field B whose lines of flux extend inwardly toward the coarse coils 142, 144. When coarse tracking movement is required to position the objective lens 122 beneath a selected track on the optical disc, current is applied to the coarse tracking coils 142, 144. The current interacts with the magnetic field B to produce forces which move the carriage 106 in the tracking direction. The forces are generated according to the Lorentz law F=BXI1, wherein F represents the force acting on the focus coil, B represents the magnetic flux density of the magnetic field between the two permanent magnets, I represents the current through the focus coil, and 1 represents the length of the coil. For example, when the current I applied to the first coarse tracking coil 142 travels through the portion of the coil positioned within the magnetic field B in the direction into the plane of the drawing sheet, a force $F_{Coarse1}$ in the direction of the arrow 320 is produced. Similarly, when current I travels through the portions of the second tracking coil 144 positioned within the magnetic field B in the direction out of the plane of FIG. 5, a force $F_{Coarse2}$ in the direction of the arrow 322 is produced. The forces $F_{Coarse1}$ and $F_{Coarse2}$ act to move the carriage 106 horizontally to the left.

Conversely, FIG. 6 shows that if the direction of the current I within the portions of the tracking coils 142, 144 within the magnetic field B is reversed, forces $F_{Coarse1'}$ and $F_{Coarse2}$ are produced which act to move the carriage into the plane of FIG. 6 (to the right in FIG. 5). The amount of movement in the tracking direction depends on the amount of current applied to the coarse coils 142, 144. In this manner, the carriage 106 is moved to position the objective lens 122 such that the laser beam 120 exiting the lens 122 is focused, within a desired information track on the surface of the optical disc.

When a control signal is generated by the optics module 102, a given current is applied to either the fine tracking coils 232, 234, 236, and 238, or the focus coil 230 depending on the direction in which the displacement of the lens holder 210 and objective lens 122 attached thereto is required. Such servo system and feedback circuits which control the amount of current are well known in the art. This current interacts with the electromagnetic field produced by the permanent magnets 250, 252 to create a force which displaces the lens holder 210 and the objective lens 122 attached thereto in the appropriate tracking or focusing direction. For example, if re-positioning is desired in the focus direction, according to a focus error signal, this signal is transmitted to a servo amplifier (not shown), which generates a current through the focus coil 230. As described above, a force is generated according to the Lorentz law F=BXI1.

Figure 7:
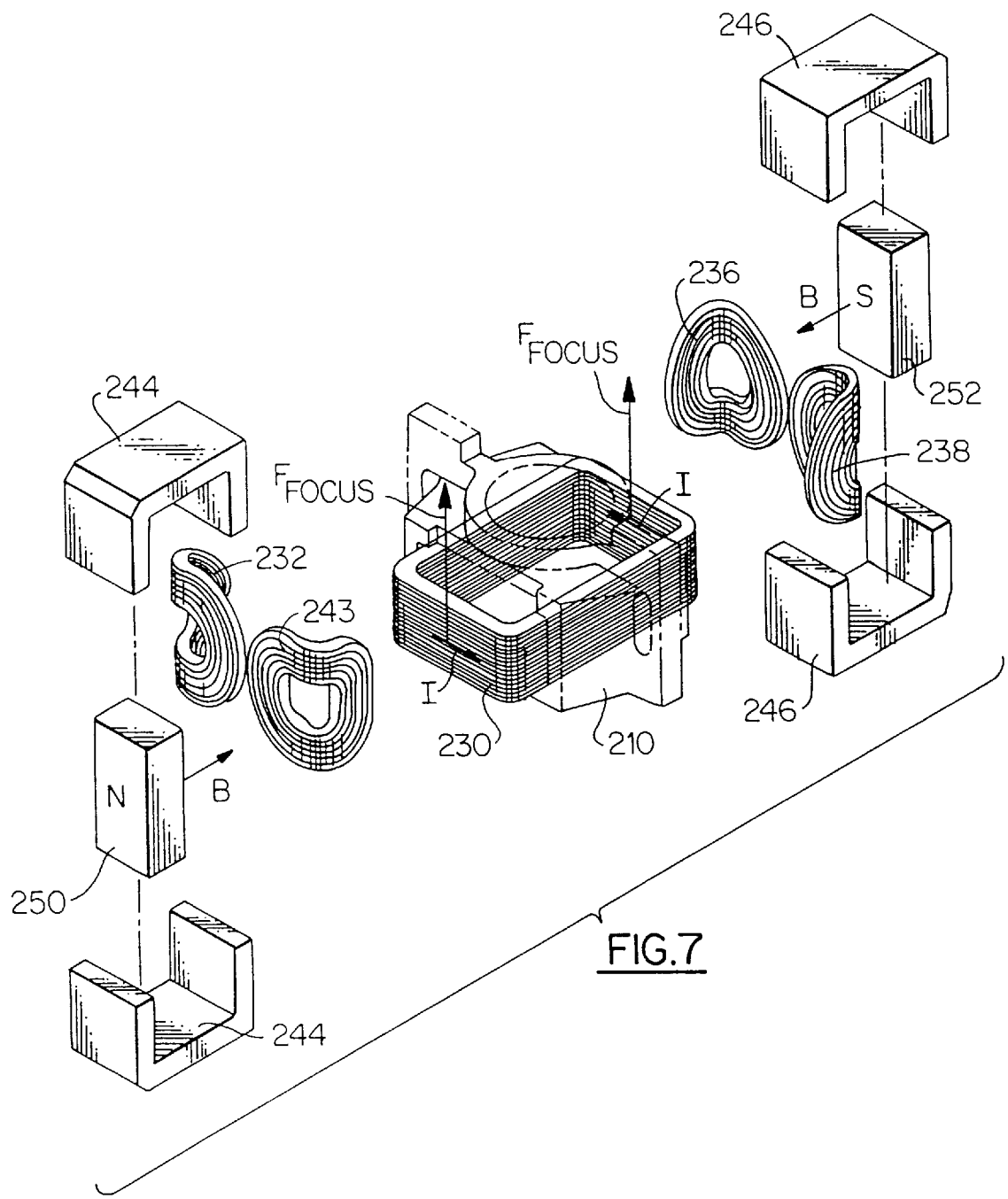
FIG. 7 is an exploded view which illustrates the focus forces acting on the actuator.

Referring to FIG. 7, the permanent magnets 250, 252 of the 2-D actuator 116 are oriented such that the south poles of each magnet 250, 252 face the lens holder 210. In this configuration, a magnetic field B is formed whose lines of flux originate at the magnets 250, 252 and are directed inwardly toward the lens holder 210 as shown. When a current I is applied to the focus coil 230 and travels through the portions of the coil 230 positioned within the magnetic field B in the direction shown, an upward force $F_{Focus}$ is generated at each section of the focus coil 230 which is translated to the flexure arms 260, 262, 264, 266, bending the flexure arms to move the lens holder 210 and associated objective lens 122 closer to the optical disc. Conversely, when the current I is run through the coil sections in the opposite directions as those illustrated, a downward force is generated which acts on the flexures to move the lens holder 210 and objective lens 122 further away from the surface of the optical disc. The magnitude of the displacement is dependent upon the amount of current applied to the focus coil 230. By moving the objective lens 122 closer to or further away from the surface of the optical disc, the focus coil 230 acts to precisely focus the laser beam 120 exiting the objective lens 122 within the desired information track on the disc.

Figure 8:
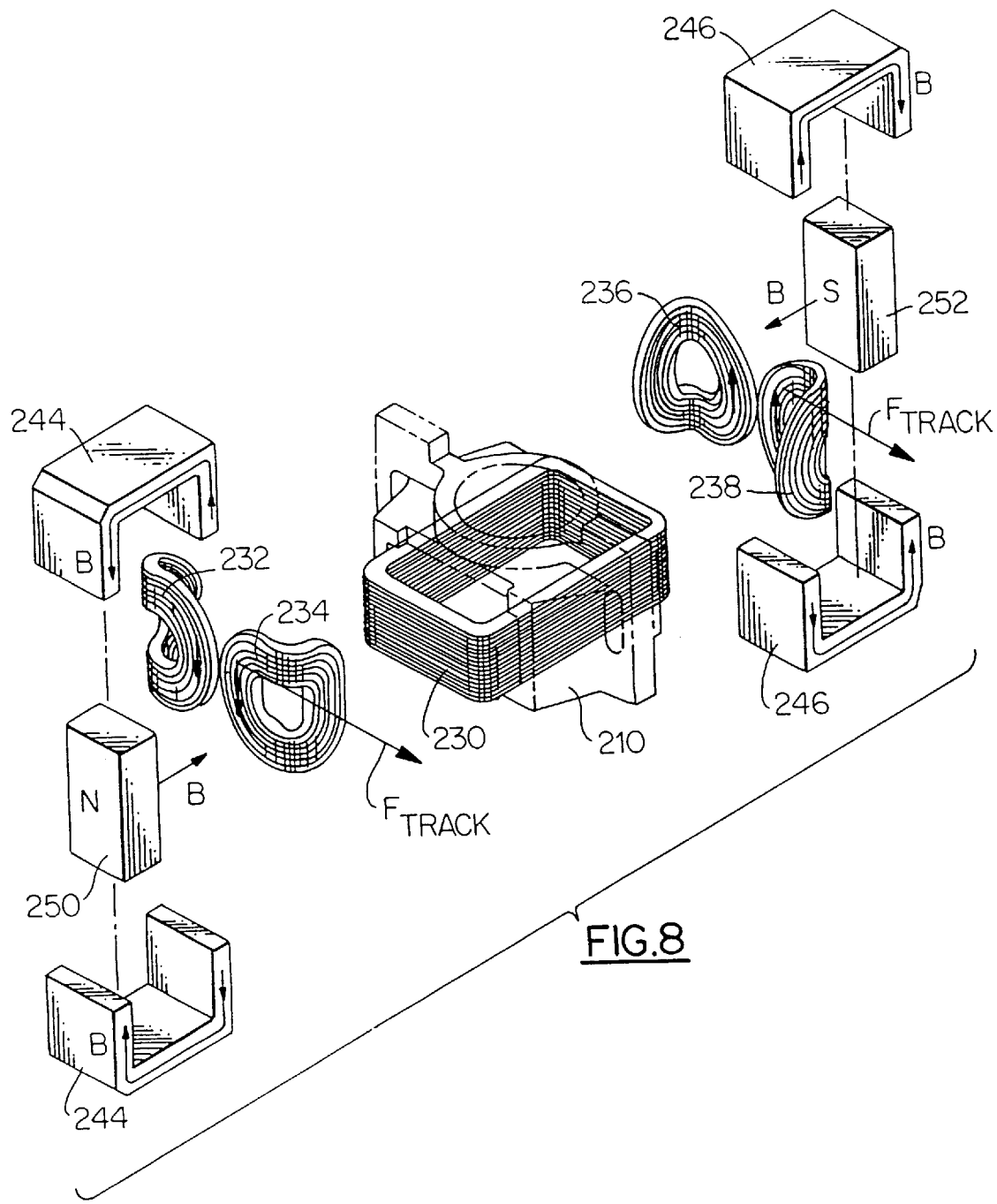
FIG. 8 is an exploded view which illustrates the fine tracking forces acting on the actuator.

As shown in FIG. 8, movement of the actuator 116 to effect fine tracking is produced when current is generated in the four fine tracking coils 232, 234, 236, and 238 affixed to the focus coil 230. When current is applied to the tracking coils in the directions shown through the portions of the tracking coils positioned within the magnetic field B, forces $F_{Track}$ are produced which move the lens holder 210 to the right. When the forces $F_{Track}$ act on the tracking coils 232, 234, 236, 238, they are translated through the focus coil 230 and lens holder 210 to the flexures 260, 262, 264, 268 which bend in the corresponding direction and the objective lens 122 is moved in the direction of the forces, to the right in FIG. 8. When current travels through the tracking coils 232, 234, 236, 238 in the opposite direction, a force is generated which acts to move the lens holder 210 to the left. The amount of current applied to the fine tracking coils 232, 234, 236, 238 is relatively small in comparison with the amount applied to the coarse tracking coils 242, 244, and the dimensions of the fine tracking coils are much smaller than the coarse coils to increase resonance frequencies and thus enable higher servo bandwidths which can then control to tighter track errors.

FIGS. 9A–16B are schematic diagrams of the actuator and carriage assembly 100 which illustrate the symmetry and balancing of forces achieved with the design of the present invention.

Figure 9A:
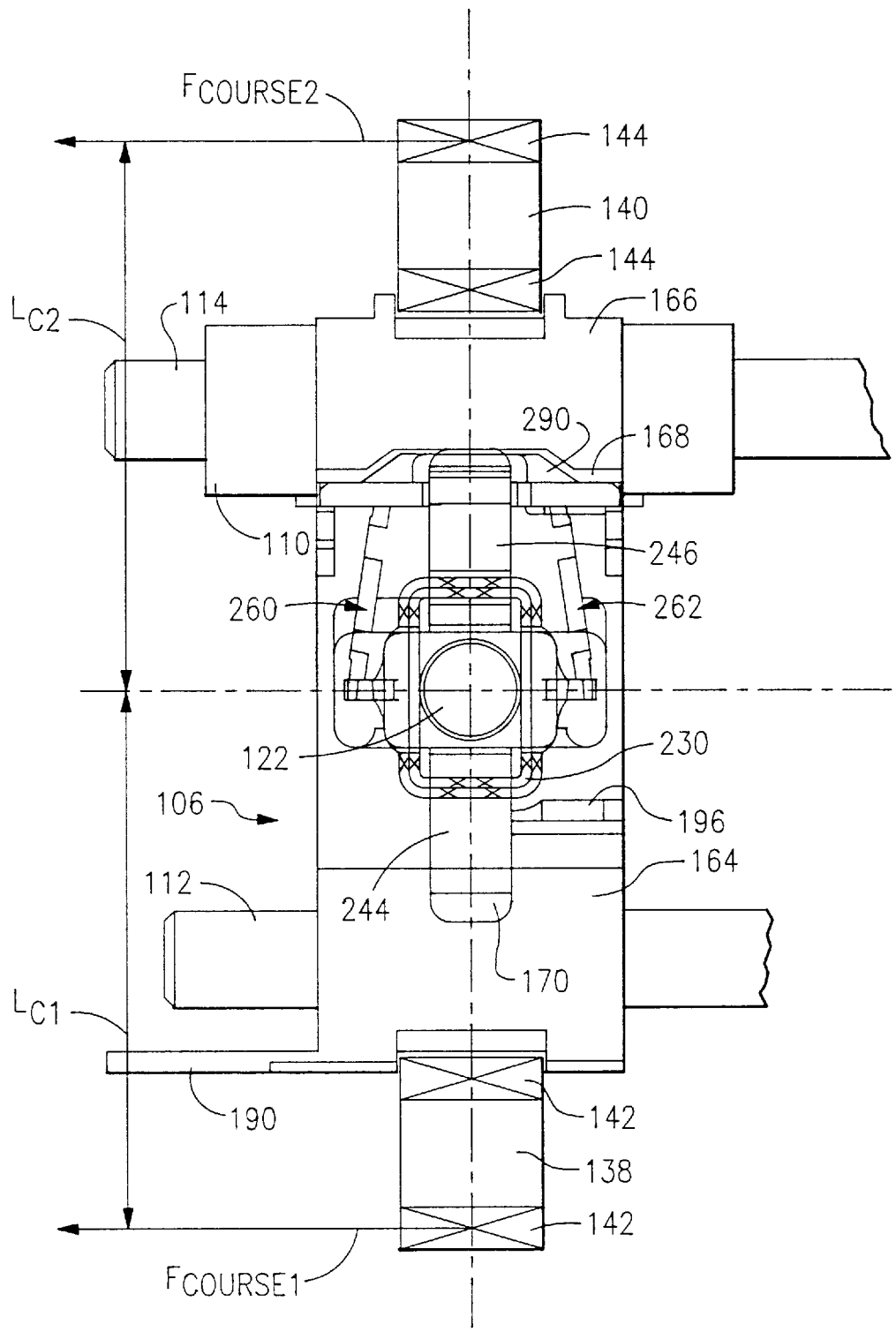
FIG. 9A is a schematic top view illustrating the symmetry of coarse tracking forces in the horizontal plane.

FIG. 9A is a schematic diagram illustrating the symmetry of coarse or carriage motor forces acting on the actuator 116 in the horizonal plane. When current is applied to the coarse tracking coils 142, 144 as described above, forces $F_{Coarse1}$ and $F_{Coarse2}$ are produced which are centered within the portion of the coarse coils 142, 144 located adjacent the permanent magnets 130, 132, respectively. The dimensions of the first coarse coil 142 are selected to equal the dimensions of the second coarse coil 144, and the current applied to each coil is the same, such that the forces $F_{Coarse1}$ and $F_{Coarse2}$ acting on the coils are equal. Further, the coarse coils 142, 144 are positioned at equal distances $L_{C1}$ and $L_{C2}$ from the objective lens 122 such that the resulting moments about the optical axis O of the objective lens 122 are equal, and the carriage yaw is minimized. In FIG. 9B, the centers of the coarse motor forces $F_{Coarse1}$ and $F_{Coarse2}$ are illustrated in the vertical plane. Because the forces $F_{Coarse1}$ and $F_{Coarse2}$ are vertically aligned with the center of mass of the carriage $CM_C$ (i.e., are generally intersected by a line orthogonal to the radial direction and the optical axis O containing the center of gravity of the carriage $CR_C$), the moments about the horizontal axis are equal, and carriage pitch which can cause the prism to deflect the beam angle, thereby introducing track offset, is reduced.

Figure 10A:
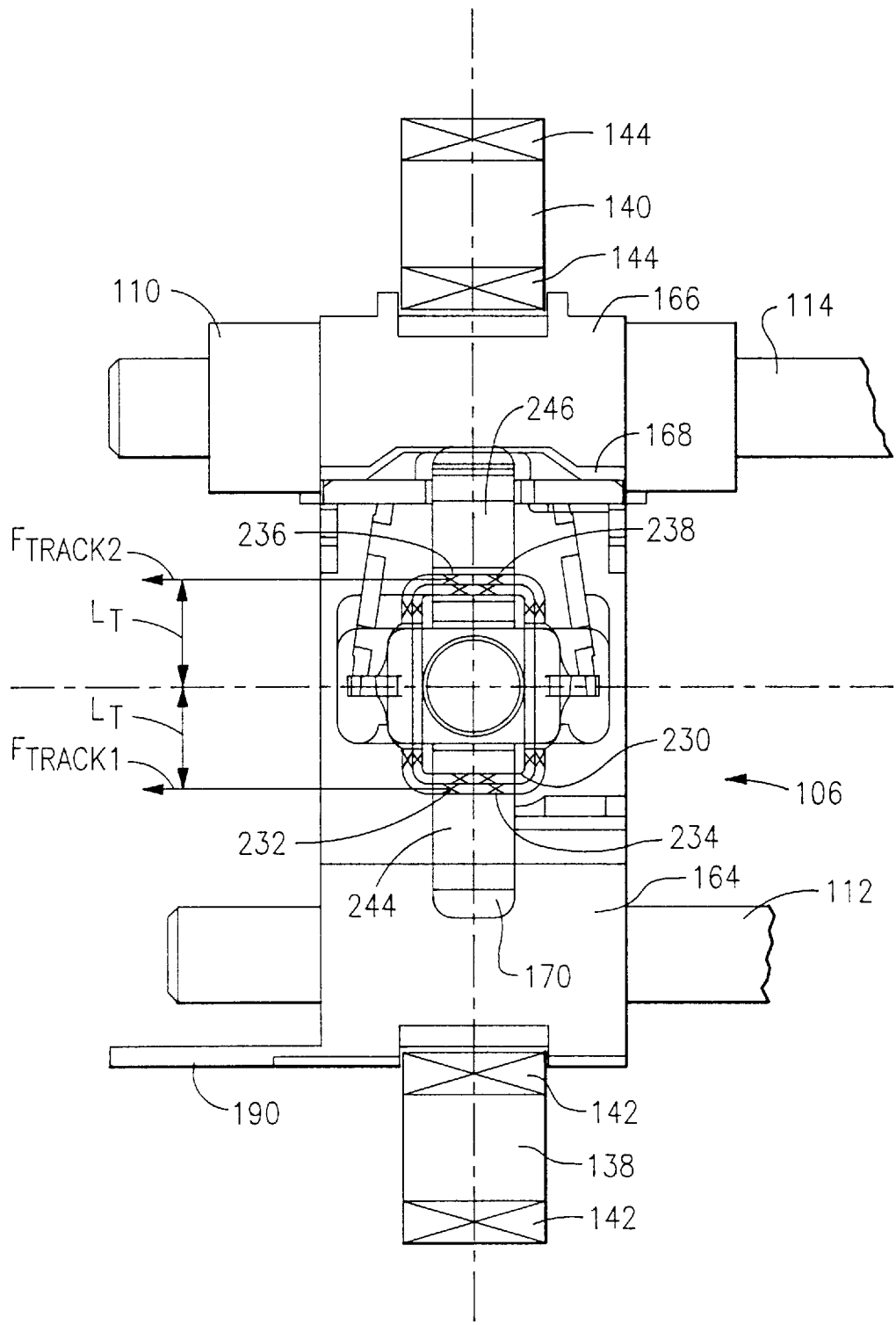
FIG. 10A is a schematic top view illustrating the symmetry of fine tracking forces in the horizontal plane.
Figure 10B:
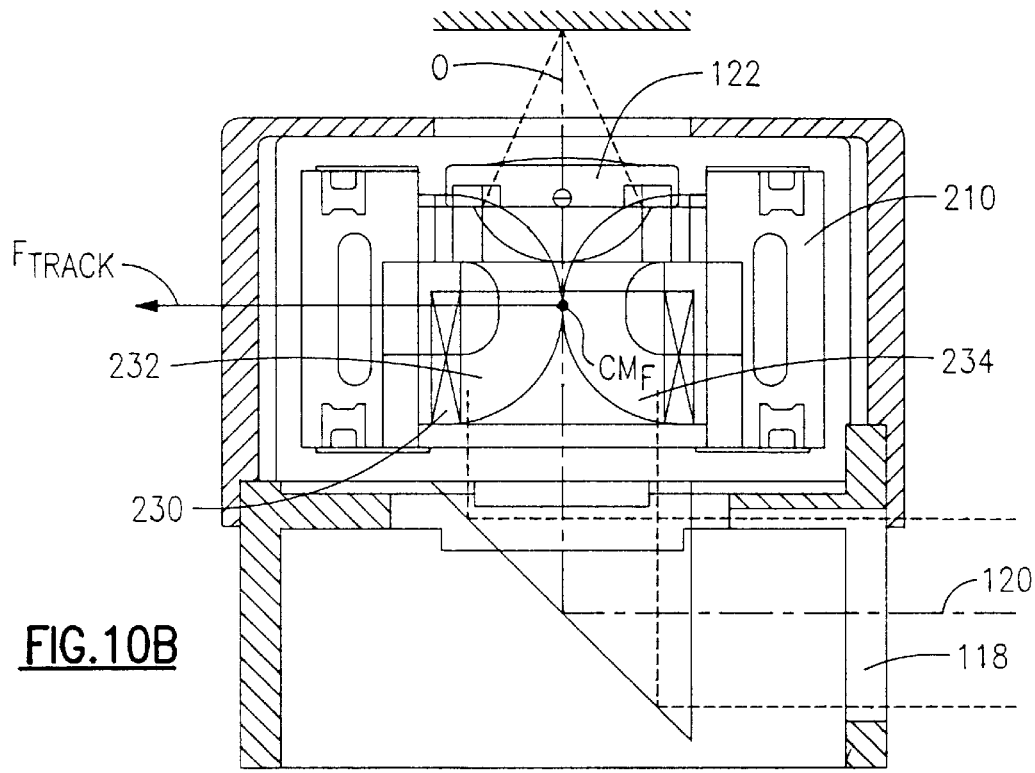
FIG. 10B is a schematic end view illustrating the alignment of the net fine tracking force with the center of mass of the fine tracking motor.

The fine tracking motor forces in the horizontal and vertical planes are illustrated in FIGS. 10A and 10B. The forces $F_{Track1}$ and $F_{Track2}$ produced by the energization of the fine tracking coils 232, 234, 236, 238 within the magnetic field induced by the permanent magnets 250, 252 are centered between the pairs of fine tracking coils 232, 234 and 236, 238, and extend horizontally in the tracking direction. The dimensions of the coils are equal and the amount of current applied to the coils is equal as well, such that the magnitude of the resulting forces $F_{Track1}$ and $F_{Track2}$ is equal. Additionally, the fine tracking coils 232, 234, 236, 238 are positioned at equal distances $L_T$ from the optical axis O of the focus lens 122, and thus, the moments produced about the optical axis O are equal, such that yaw of the lens holder 210 and lens 122 carried thereon about the vertical axis is decreased. As illustrated in FIG. 10B, the resultant fine tracking force $F_{Track}$ acts on the center of mass of the fine motor mass $CM_F$, such that lens holder pitch is minimized.

Figure 11B:
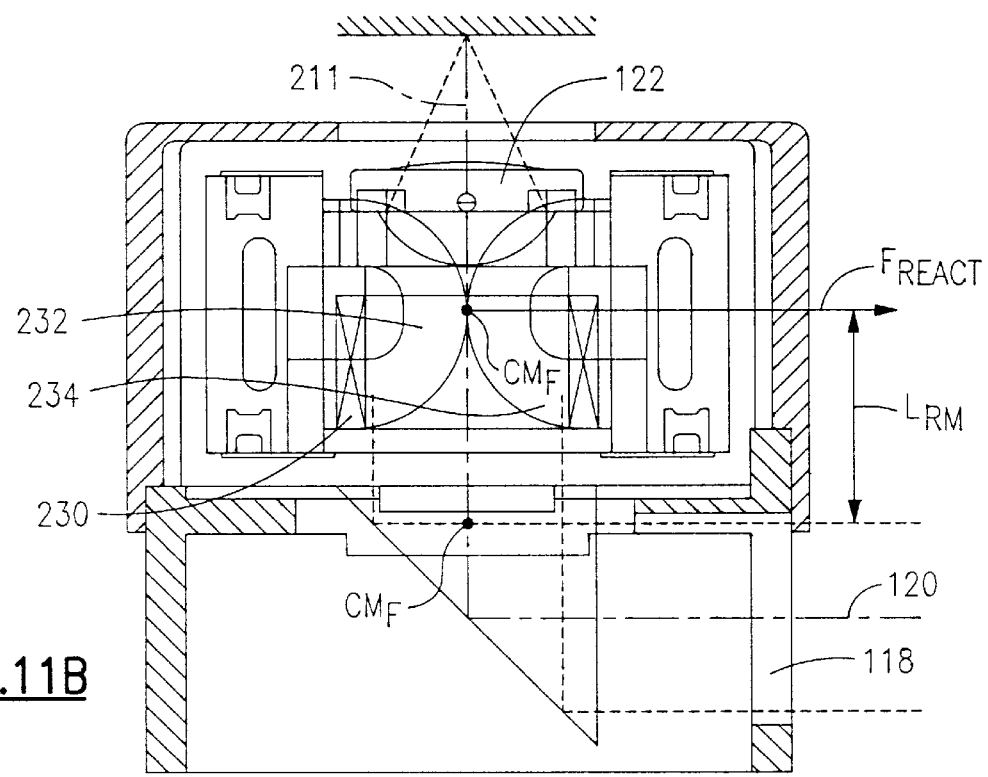
FIG. 11B is a schematic end view illustrating the alignment of the net fine tracking reaction force with the center of mass of the fine tracking motor.
Figure 11A:
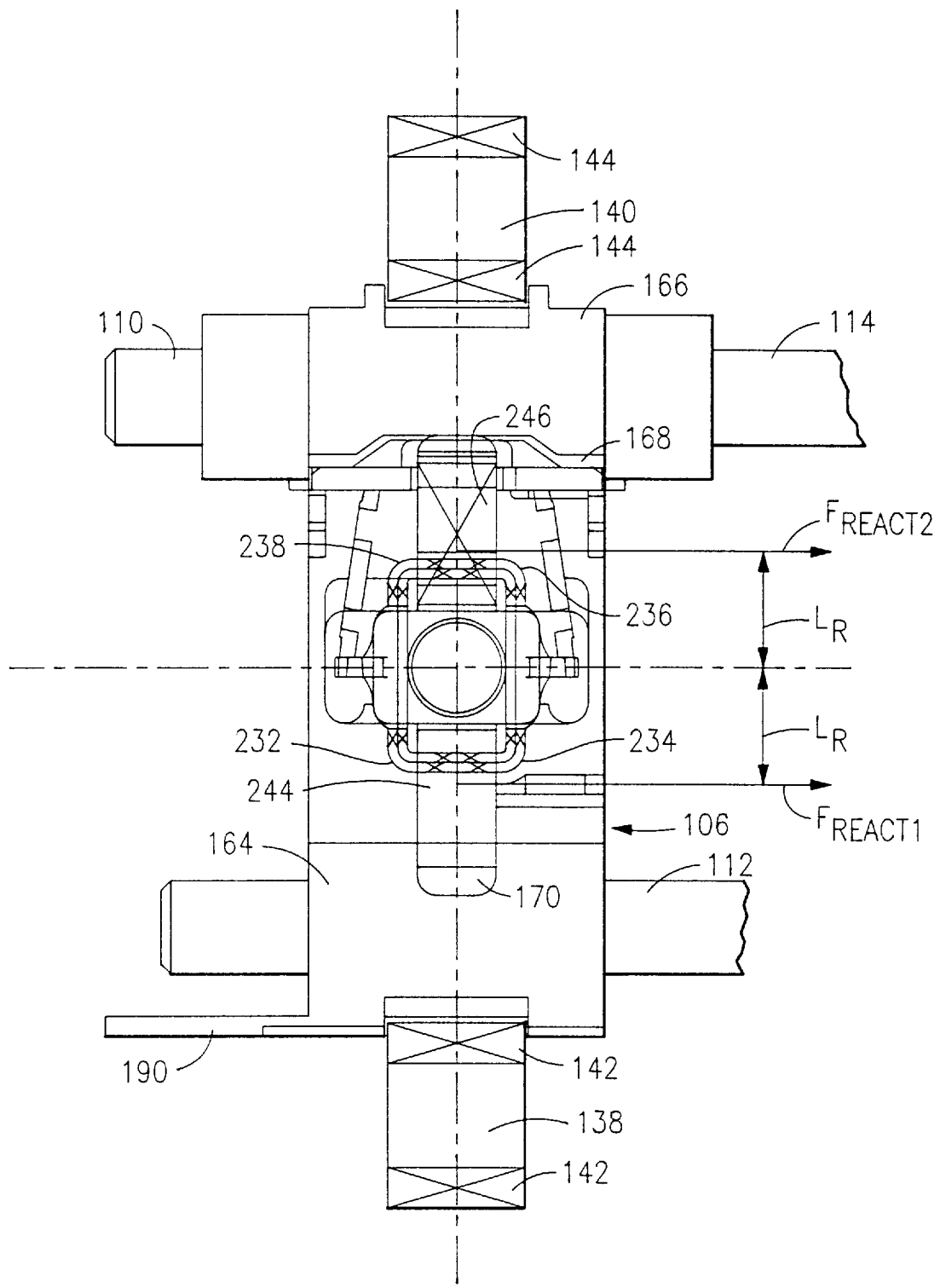
FIG. 11A is a schematic top view illustrating the symmetry of fine tracking reaction forces in the horizontal plane.

FIG. 11A illustrates the reaction forces $F_{React1}$ and $F_{React2}$ resulting from the fine tracking motor which act upon the carriage 106 in opposition to the fine tracking motor forces $F_{Track1}$ and $F_{Track2}$ illustrated in FIG. 10A. These reaction forces $F_{React1}$ and $F_{React2}$ act on the pole pieces 244, 246 positioned over the tracking coils 232, 234, 236, 238 on each side of the lens holder 210. As described above, the magnitude of the tracking forces $F_{Track1}$ and $F_{Track2}$ is equal. Further, the dimensions of the pole pieces 244, 246 are equal, such that the reaction forces $F_{React1}$ and $F_{React2}$ produced are equal. Because the pole pieces 244, 246 are positioned at equal distances $L_R$ from the optical axis O of the lens 122, the moments about the optical axis O are equal in magnitude, reducing rotation about the vertical axis, or yaw. FIG. 11B illustrates the resultant reaction force $F_{React}$ in the vertical plane. As shown, the reaction force $F_{React}$ acts at the center of mass of the fine motor mass $CM_F$, at a distance $L_{RM}$ above the center of mass of the carriage mass $CM_C$, and thus a moment will act on the carriage 106. However, because the distance $L_{RM}$ and the reaction forces $F_{React1}$ and $F_{React2}$ are fairly small, this moment is relatively small and does not significantly affect carriage performance.

Figure 12B:
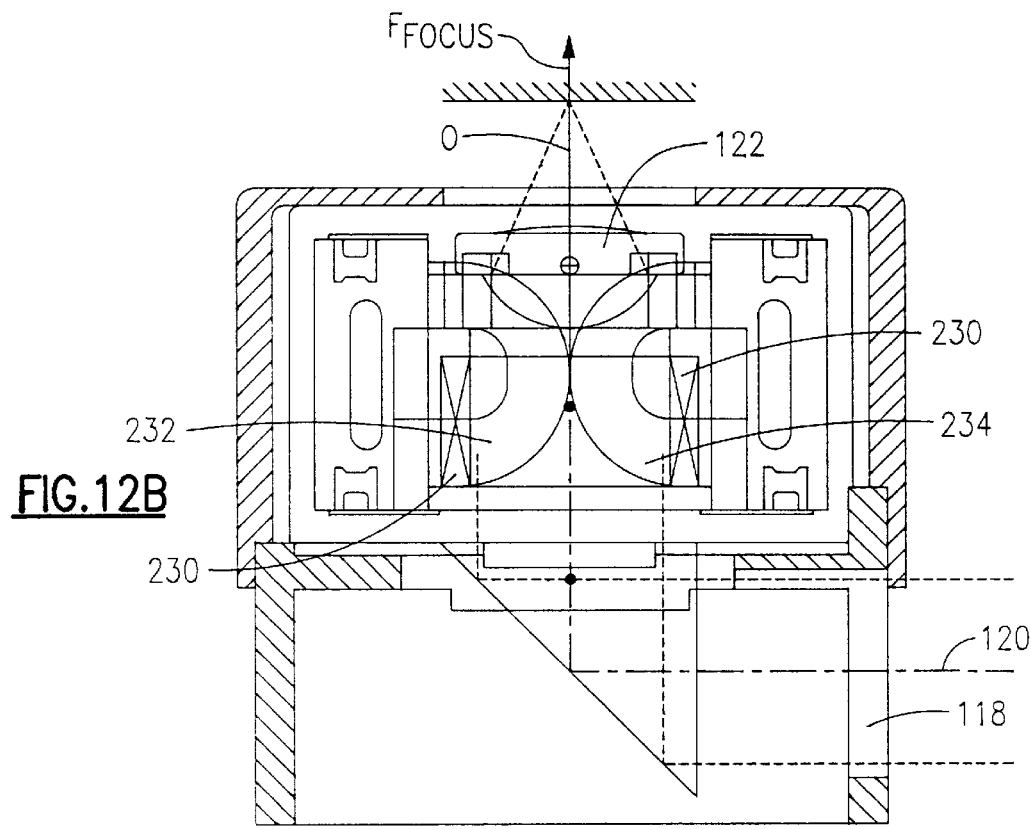
FIG. 12B is a schematic end view illustrating the alignment of the net focus force with the optical axis of the objective lens.

The resultant focus forces $F_{Focus1}$ and $F_{Focus2}$ acting on the 2-D actuator 116 are illustrated in FIG. 12A. The focus forces $F_{Focus1}$ and $F_{Focus2}$ are centered in the portions of the focus coil 230 located between the tracking coils 232, 234, 236, 238 and pole pieces 244, 246, adjacent the permanent magnets 250, 252. The focus coil 230 is wound within the opening 212 in the lens holder 210, FIG. 4, such that the same amount of current flows through each side of the coil 230 adjacent the magnets, thus producing equal forces $F_{Focus1}$ and $F_{Focus2}$ at the sides of the lens holder 210 which act to move the lens holder and objective lens 122 carried thereon in a vertical direction. The coil is positioned symmetrically within the opening 212 in the lens holder 210 such that the centers of the forces $F_{Focus1}$ and $F_{Focus2}$ produced are positioned equidistantly at distances $L_F$ from the optical axis O of the objective lens 122. In this configuration, the moments produced about the optical axis O of the lens 122 are equal, reducing roll of the lens holder 210. Additionally, as illustrated in FIG. 12B, when viewed from the end of the carriage, the focus forces $F_{Focus1}$ and $F_{Focus2}$ ($F_{Focus}$ in the drawing) are aligned with the center of mass $CM_C$ of the carriage mass, thereby reducing pitch of the carriage 106.

Figure 13B:
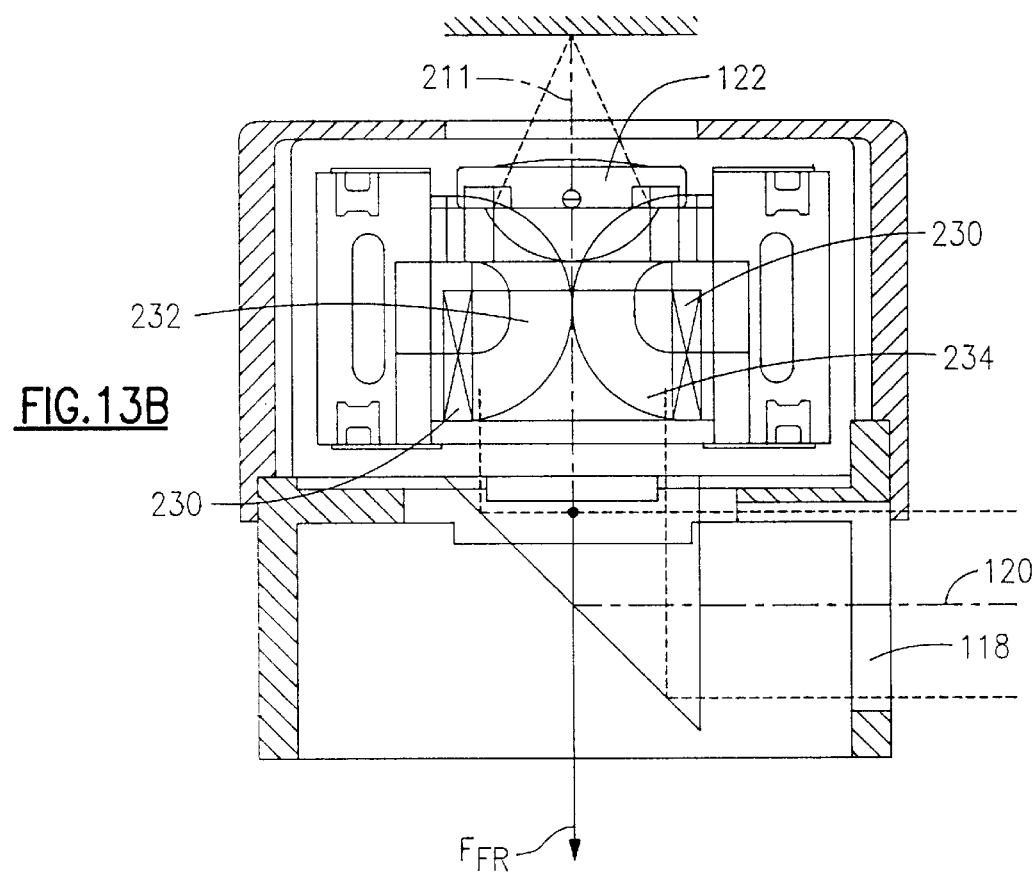
FIG. 13B is a schematic end view which illustrates the alignment of the net focus reaction force with the optical axis of the objective lens.

The reaction forces $F_{Focus1}$ and $F_{Focus2}$ produced in response to the focus forces $F_{Focus1}$ and $F_{Focus2}$ shown in FIG. 12A are illustrated in the horizontal plane in FIG. 13A. The reaction forces $F_{FR1}$ and $F_{FR2}$ are equal in magnitude and opposite in direction to the focus forces $F_{Focus1}$ and $F_{Focus2}$ and are centered adjacent the fine motor permanent magnets 250, 252 intermediate the pole pieces 244, 246. As described above, the focus forces $F_{Focus1}$ and $F_{Focus2}$ are equal, and thus, the reaction forces $F_{FR1}$ and $F_{FR2}$ are equal as well. Further, the reactions forces $F_{FR1}$ and $F_{FR2}$ act at equal distances $L_{FR}$ from the optical axis O of the objective lens 122 to further reduce pitch. Additionally, as illustrated in FIG. 13B, when viewed from the end of the carriage 106, the focus forces $F_{FR1}$ and $F_{FR2}$ ($F_{FR}$ in the drawing) are aligned with the center of mass $CM_C$ of the carriage mass, thereby reducing pitch of the carriage.

Figure 14:
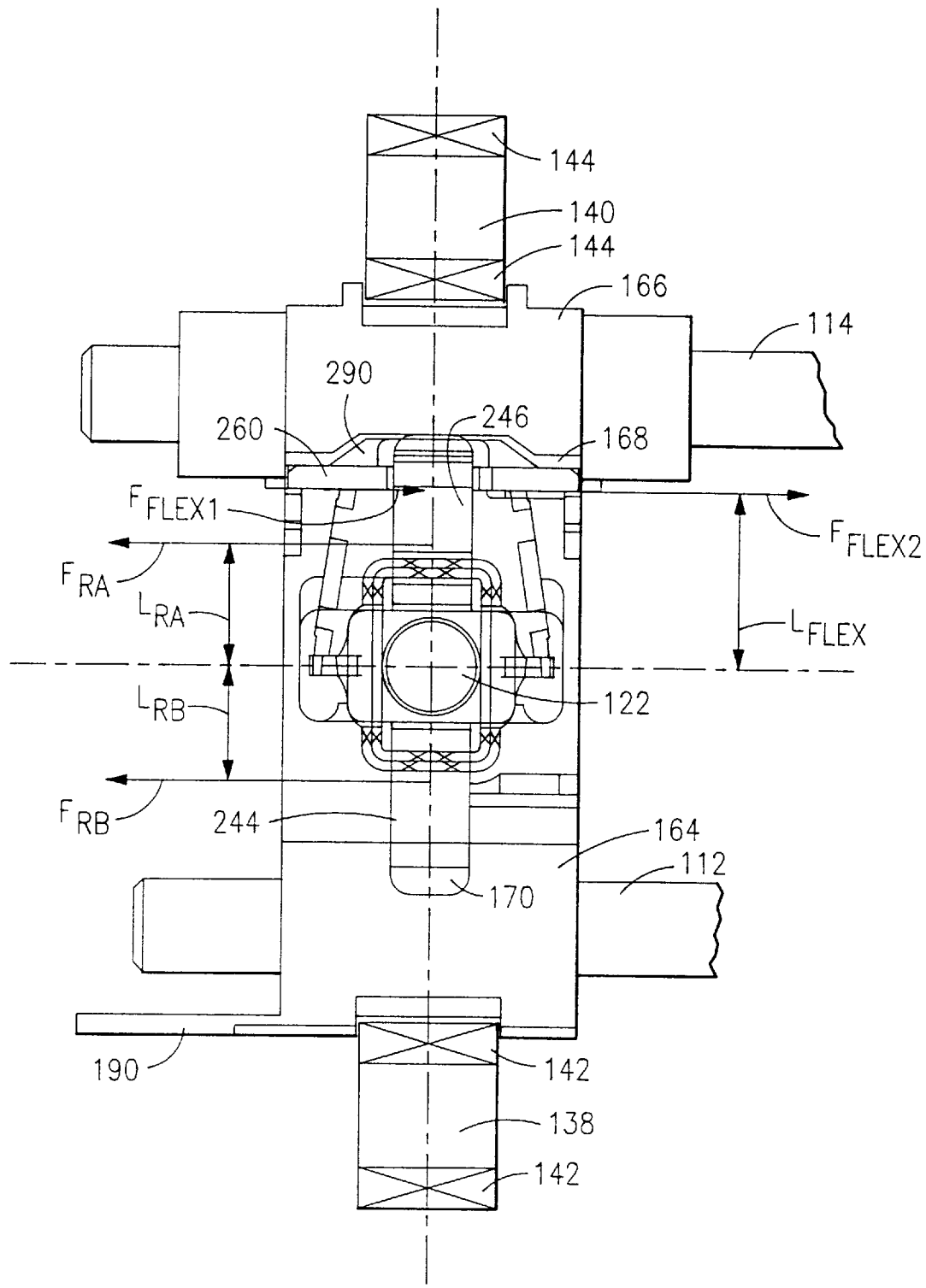
FIG. 14 is a schematic top view illustrating the flexure forces and fine motor reaction forces generated in response to the flexure forces.

The forces $F_{Flex1}$ and $F_{Flex2}$ generated by the flexure arms 260, 262, 264, 266 on the lens holder 210 are illustrated in FIG. 14. The forces $F_{Flex1}$ and $F_{Flex2}$ illustrated are those acting on the upper flexure arms 260, 262. Those skilled in the art, however, will recognize that identical forces act on the lower flexure arms 264, 268, as well. The forces $F_{Flex1}$ and $F_{Flex2}$ acting on the upper flexure arms 260, 262, respectively, are centered at the crossbar sections 280 of the flexure arms 260, 262 where the flexure arms are attached to the support member 290. As previously described, when these forces $F_{Flex1}$ and $F_{Flex2}$ act on the flexure arms 260, 262, the flexure arms bend in the appropriate direction to achieve fine tracking. To maintain the flexure arms 260, 262 in their bent condition, the fine motor generates reaction forces $F_{RA}$ and $F_{RB}$ which are centered at the pole pieces 244, 246 on either side of the lens holder 210. As shown, the flexure forces $F_{Flex1}$ and $F_{Flex2}$ act a distance $L_{Flex}$ from the optical axis O of the focus lens 122, while the reaction forces $F_{RA}$ and $F_{RB}$ act distances $L_{RA}$ and $L_{RB}$ from the optical axis O, respectively. It will be apparent to those skilled in the art that the moments produced about the optical axis O of the lens 122 by the pairs of forces are not equal, since ($F_{Flex1}$+$F_{Flex2}$) does not equal ($F_{RA}$ $L_{RA}$+$F_{RB}$ $L_{RB}$). However, since these forces are effectively decoupled from the carriage except at very low frequencies (typically below around 40 Hz), these forces do not affect actuator performance at most normal operating conditions.

Figure 15B:
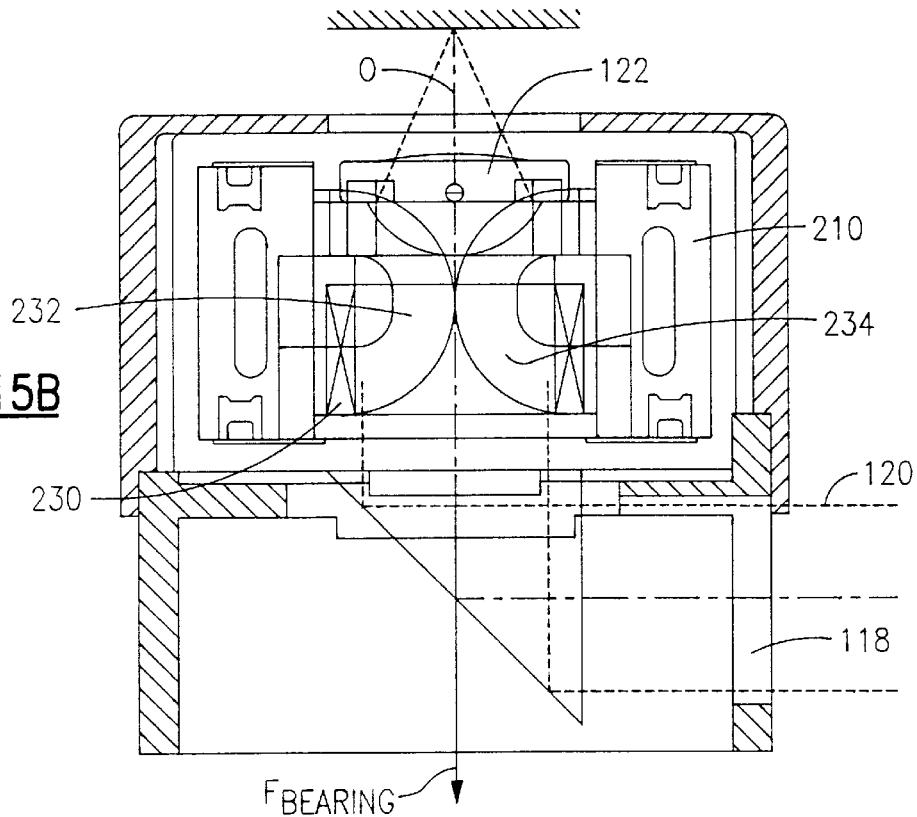
FIG. 15B is a schematic end view illustrating the alignment of the net carriage suspension force with the optical axis of the objective lens.

As described above, the carriage 106 includes two bearing surfaces 108, 110 which are slidably mounted on the guide rails 112, 114 in order to position the carriage 106 beneath various data tracks on the optical disc. In essence, the bearings 108, 110 act as "springs" which hold the carriage 106 above the rails 112, 114. The bearing "spring" stiffness forces $F_{Bearing1}$ and $F_{Bearing2}$ are illustrated in FIGS. 15A–B. The forces $F_{Bearing1}$ and $F_{Bearing2}$ are centered at the point of contact between the bearing surfaces 108, 110 and the rails 112, 114 and extend downward through the center of the rails. As described above, the surface contact area between the bearing surface 108 and rail 112 is approximately equal to the surface contact area between the bearing surface 110 and rail 114, and thus these stiffness forces $F_{Bearing1}$ and $F_{Bearing2}$ are substantially equal. Further, the bearing surfaces 108, 110 are positioned at equal distances $L_{Bearing}$ from the optical axis O of the lens 122 so that the moments about the optical axis O produced by these forces $F_{Bearing1}$ and $F_{Bearing2}$ are equal, minimizing carriage pitch. Referring to FIG. 15B, in the vertical plane, the net carriage suspension force $F_{Bearing}$ acts at a point directly between the two bearings and aligned with the optical axis O.

Figure 16A:
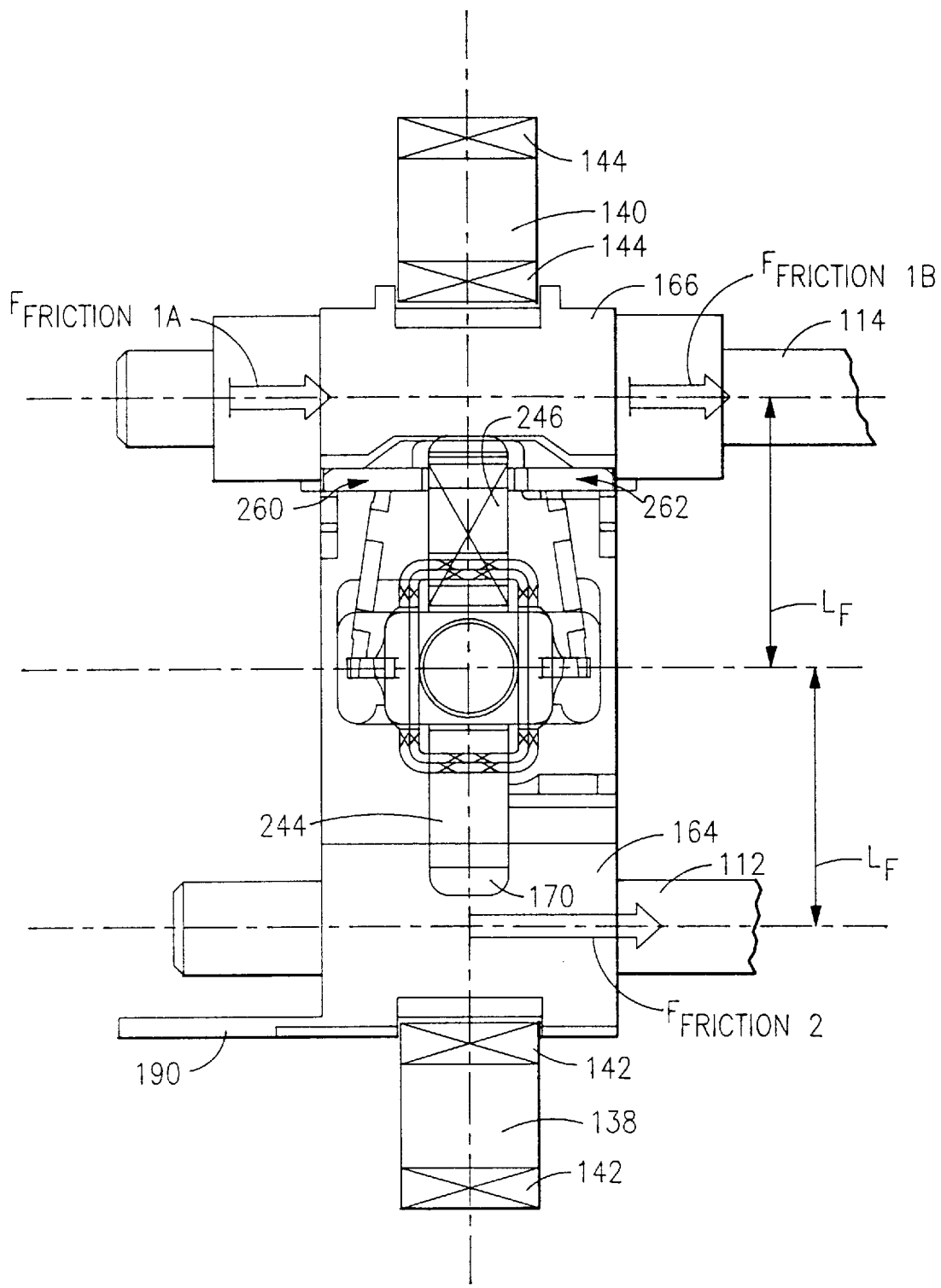
FIG. 16A is a schematic top view which illustrates the symmetry of friction forces in the horizontal plane.

The friction forces $F_{Friction1A}$, $F_{Friction1B}$, and $F_{Friction2}$ acting on the bearing surfaces 108, 110 and rails 112, 114 are illustrated in FIG. 16A. As the first bearing surface 108 comprises two sections 160, 162, two friction forces $F_{Friction1A}$ and $F_{Friction1B}$ are present, one associated with each bearing section 160, 162, respectively, which are centered at the middle of the bearings along the area of contact with the rails 112. A second friction force $F_{Friction2}$ acts on the second bearing surface 110 and is centered in the middle of the bearing along its contact with the rail 114 as shown. Because the area of contact of the bearing sections 160, 162 forming the first bearing surface 108 substantially equals the area of contact of the second bearing surface 110, and the amount of pre-loading and coefficient of friction is the same for both bearing surfaces, the sum of the friction forces $F_{Friction1A}$ and $F_{Friction1B}$ equals the friction force $F_{Friction2}$. The bearing surfaces 112, 114 are located at equal distances $L_F$ from the optical axis O of the focus lens 122, and the resulting moments about the optical axis of the lens are then equal as well. In the vertical plane, the forces $F_{Friction1A}$, $F_{Friction1B}$, and $F_{Friction2}$, act at the areas of contact between the rails 112, 114 and the bearing surfaces 108, 110, as shown in FIG. 16B which are advantageously designed to be horizontally aligned with the center of mass of the carriage mass $CM_C$, such that moments about the center of mass which can produce carriage pitch are reduced.

Figure 17:
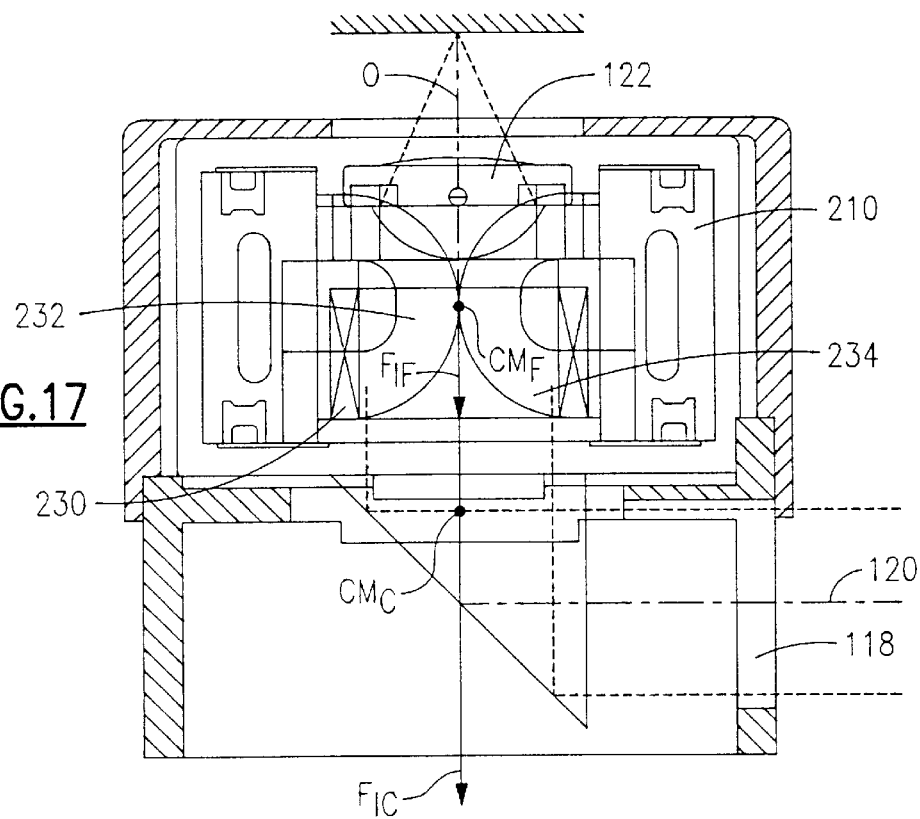
FIG. 17 is a schematic end view which illustrates the net inertial forces acting at the center of mass of the fine motor and center of mass of the carriage in response to a vertical acceleration.

FIGS. 17–20 illustrate the inertial forces acting on the carriage 106 and 2-D actuator 116 for both vertical and horizontal accelerations. The inertial forces acting on the fine motor and carriage in response to a vertical acceleration of the assembly are shown in FIG. 17. A first downward inertial force $F_{IF}$ equal to the mass of the fine motor multiplied by the acceleration acts at the center of mass of the fine motor mass $CM_F$. A second downward inertial force $F_{IC}$ acts at the center of mass of the carriage mass $CM_C$ and is equal to the mass of the carriage multiplied by the acceleration. FIG. 18A and 18B further illustrate that the inertial forces $F_{IF}$ and $F_{IC}$ are horizontally aligned with the optical axis O of the objective lens 122.

Figure 19A:
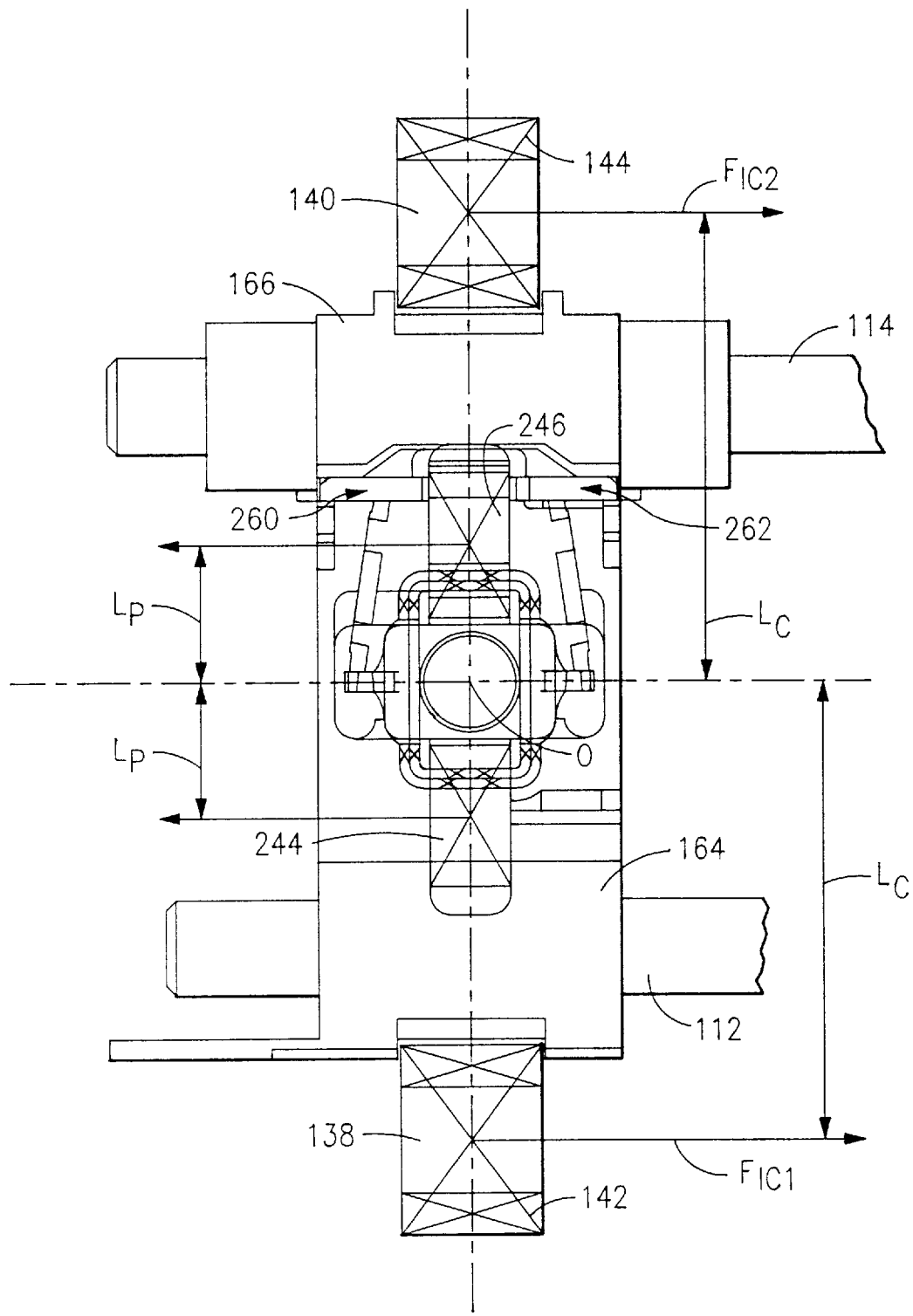
FIG. 19A is a schematic top view which illustrates the inertial forces acting on components of the carriage and actuator assembly for horizontal accelerations.
Figure 19B:
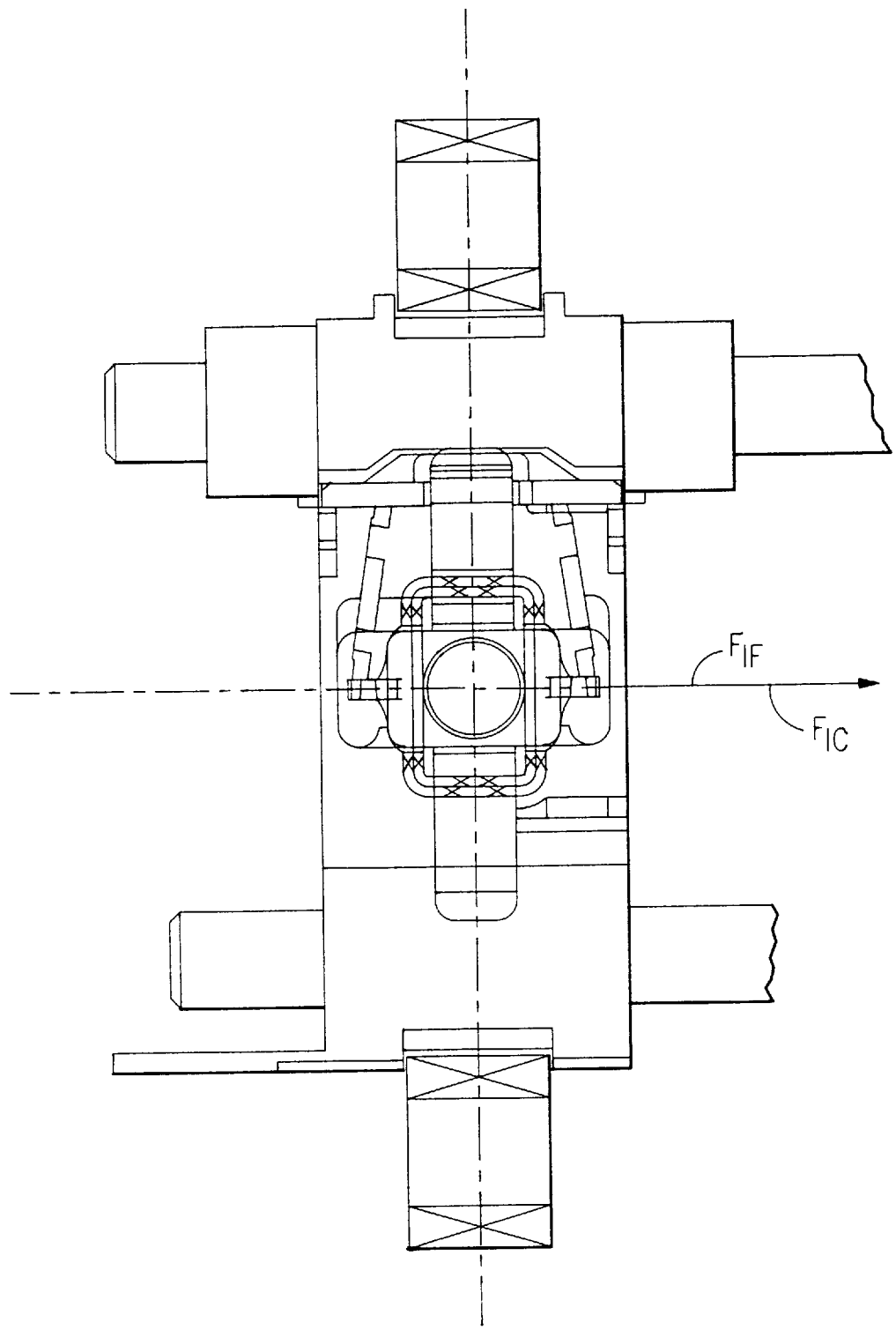
FIG. 19B is a schematic top view illustrating the net inertial forces for horizontal accelerations.

FIG. 19A illustrates the inertial forces acting on the coarse coils 142, 144 and fine motor pole pieces 244, 246 for horizontal accelerations of the carriage and fine motor, respectively. An inertial force $F_{IC1}$ acts at the center of upper portion of the first coarse coil 142 and an inertial force $F_{IC2}$ acts at the center of the upper portion of the second coarse coil 144. As described above, the coils 142, 144 are of identical dimensions, such that the mass of the first coil 142 equals the mass of the second coil 144. The magnitude of each force $F_{IC1}$, $F_{IC2}$ is equal to mass of the respective coil multiplied by the acceleration, and thus, the inertial forces acting on the coils 142, 144 are equal. Because the coils 142, 144 are positioned at equal distances $L_C$ from the optical axis O of the objective lens 122, the resulting moments about the optical axis of the lens produced by the inertial forces $F_{IC1}$ and $F_{IC2}$ are equal. Similarly, because the fine motor pole pieces 244, 246 are of equal dimensions and are located at equal distances $L_P$ from the optical axis O, the inertial forces $F_{IP1}$ and $F_{IP2}$ acting on the pole pieces are equivalent, and the resulting moments about the optical axis O of the objective lens 122 are equal. Applying this same analysis to all other components or "subparts" of the carriage and actuator assembly, and as will be explained in more detail below, the inertial forces produced by horizontal and vertical accelerations above the resonance frequency of the flexure arms are balanced and symmetric with respect to the optical axis O. The net inertial forces of the fine motor and carriage $F_{IF}$ and $F_{IC}$ for acting on the assembly for horizontal accelerations thus act along a line through the center of the carriage which intersects the optical axis O as shown in FIG. 19B. The net inertial force due to the coarse motor $F_{IC}$ is equal to the mass of the coarse motor multiplied by the acceleration, while the net inertial force due to the fine motor $F_{IF}$ is equal to the mass of the fine motor multiplied by the acceleration.

Figure 20A:
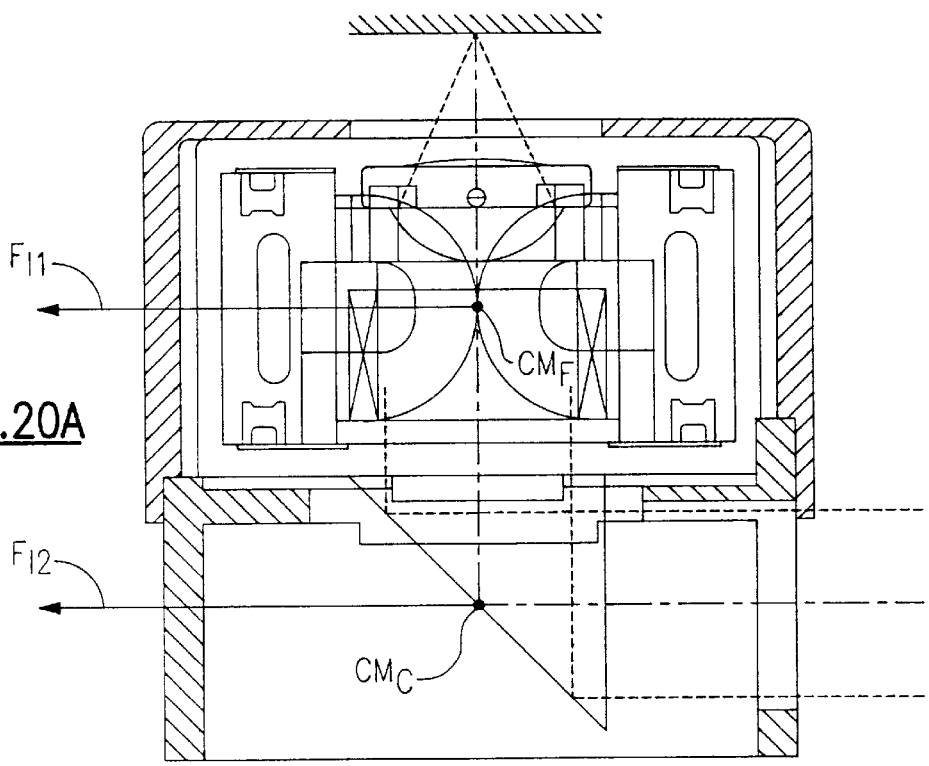
FIG. 20A is a schematic end view which illustrates the fine motor and carriage inertial forces for accelerations above the flexure arm resonance frequency.

At high frequencies, i.e., accelerations in the tracking direction above the lens holder-flexure arm resonance frequency, approximately 40 Hz, components of the assembly 100 decouple and do not affect the position of the objective lens 122. Consequently, the inertial forces differ for accelerations above and below the flexure arm resonance frequency. The inertial forces for horizontal accelerations at these high frequencies are illustrated in FIG. 20A. At these high frequencies, the actuator 116 is decoupled from the carriage 106, such that a first inertial force $F_{I1}$ equal to the mass of the fine motor multiplied by the acceleration acts at the center of mass of the fine motor mass $CM_F$, and a second inertial force $F_{I2}$ equal to the mass of the coarse motor multiplied by the acceleration is centered at the center of mass of the carriage mass $CM_C$.

Figure 20B:
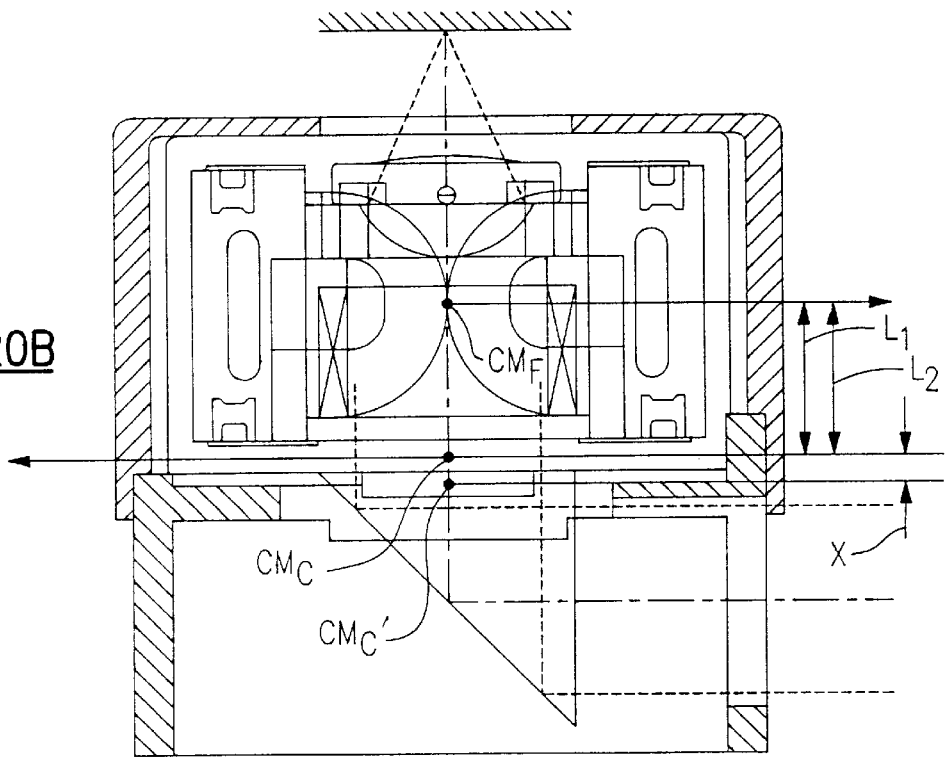
FIG. 20B is a schematic end view which illustrates the fine motor and carriage inertial forces for accelerations below the flexure arm resonance frequency.

FIG. 20B illustrates the inertial forces at horizontal accelerations below the flexure arm resonance frequency. At these lower frequencies, the fine motor mass and carriage mass move as a unit which has a net center of mass at $CM_{C'}$. As illustrated, this net center of mass $CM_{C'}$ is located at a distance x vertically above the center of mass of the carriage mass $CM_C$, and thus the coarse motor forces $F_{Coarse1}$ and $F_{Coarse2}$, and the friction forces $F_{Friction1}$ and $F_{Friction2}$, are no longer aligned with the carriage mass center of mass, now shifted to $CM_{C'}$. Although this vertical shift in the carriage center of mass occurs, the symmetrical design of the assembly 100 ensures that the center of mass of the carriage mass $CM_C$ does not shift in the horizontal plane, and the forces acting on the carriage remain symmetrical about the center of mass and optical axis O in spite of the vertical shift in the center of mass from $CM_C$ to $CM_{C'}$.

Further, the symmetry of the design ensures that horizontal shifting of the center of mass $CM_C$ does not occur when subparts or components of the carriage decouple at high frequencies. For example, at frequencies in the KHz range, the fine motor poles pieces 244, 246 and magnets 250, 252 will decouple. Due to the symmetry of the design, however, the center of mass will not shift in the horizontal plane. Because there is no shift of the center of mass $CM_C$ in the horizontal plane, reaction forces of the focus motor will not pitch or roll the carriage at frequencies above those where subparts have come "loose". Thus, by horizontally aligning the center of mass with the optical axis O of the objective lens 122, the lens sits "in the eye of the storm", where its position is minimally affected by resonance, motor, and reaction forces acting on the assembly 100.

Figure 21A:
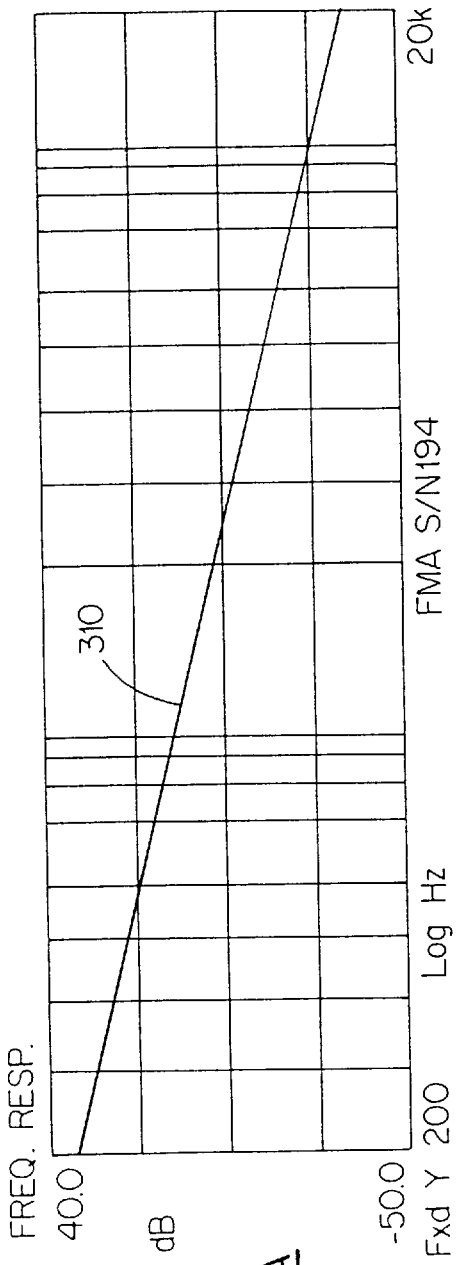
FIGS. 21A–21D comprise a diagram illustrating the relationship between the fine tracking position versus fine motor current.
Figure 21B:
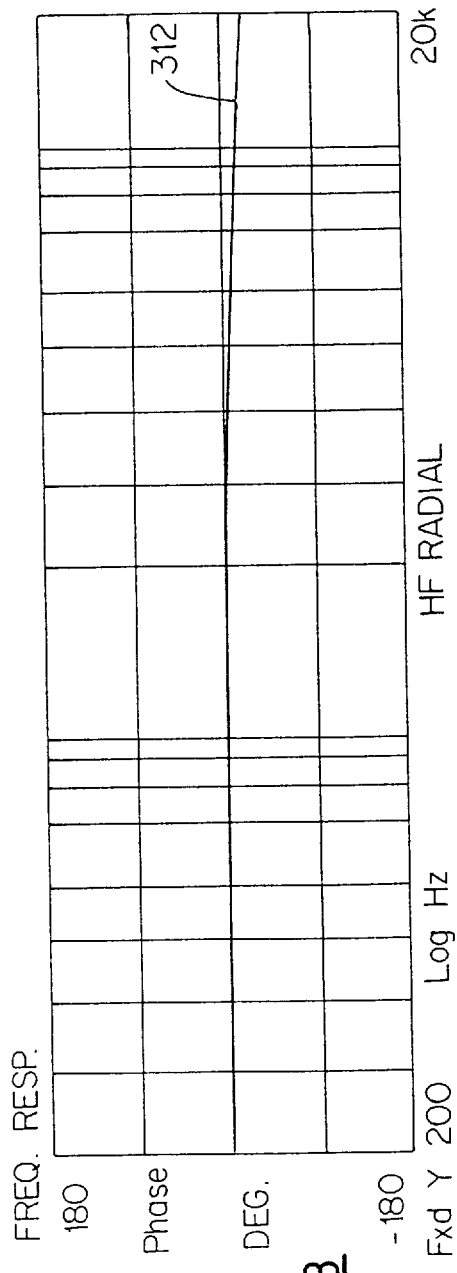
Figure 21C:
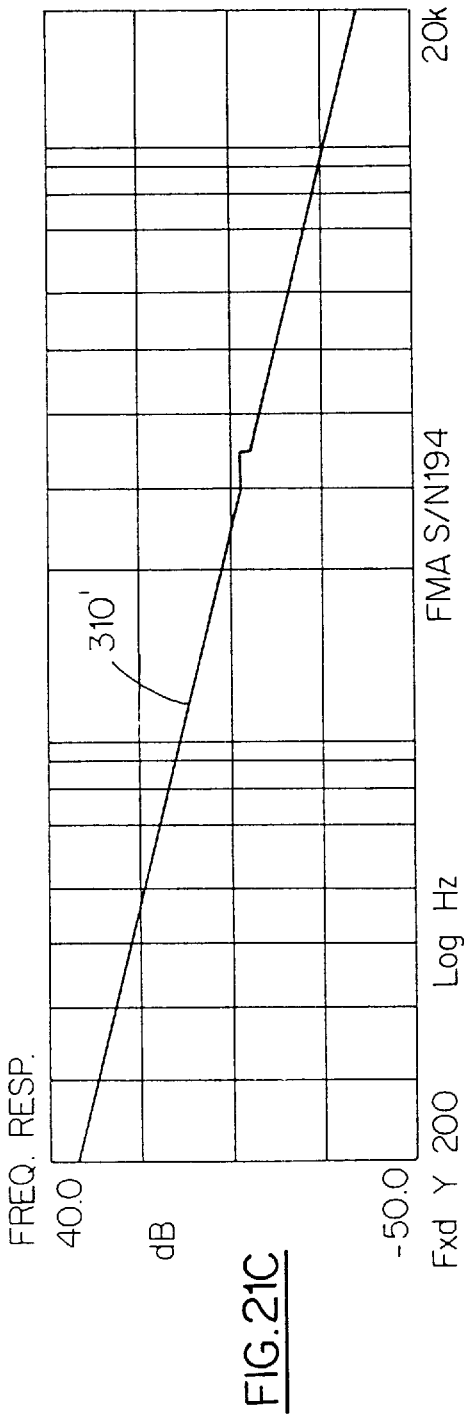
Figure 21D:
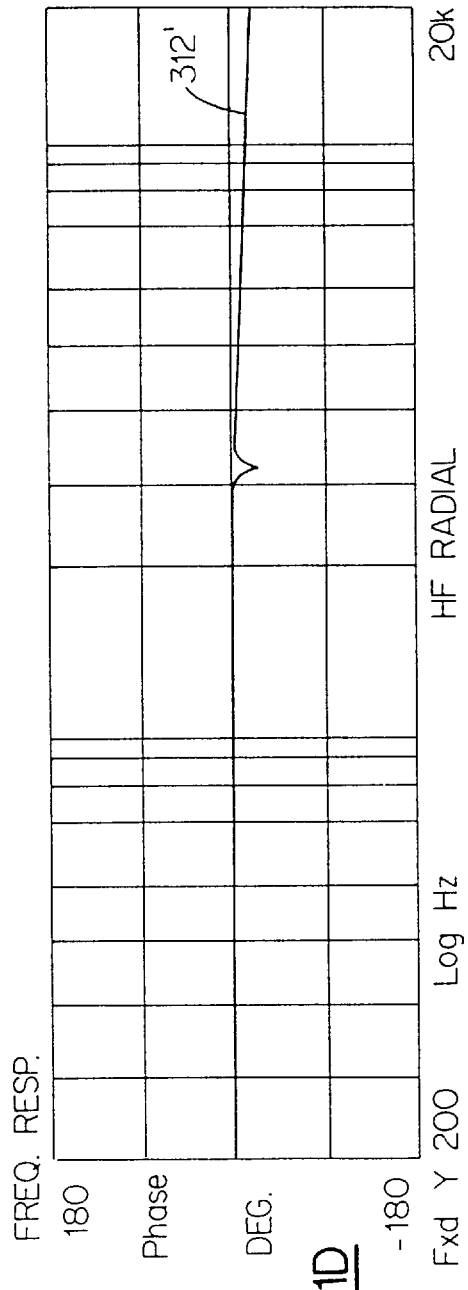

FIGS. 21A–B illustrate the Bode transfer diagram of fine tracking position versus fine motor current of the actuator 116 of the present invention for an objective lens of 0.24 grams suspended in a fine motor having a mass of 1.9 grams. As illustrated in FIG. 21A, the actuator exhibits almost ideal dB curve 310 having an approximate 40 dB/decade slope and an ideal phase shift curve 312 having a 45 degree phase margin. FIG. 21C–D illustrate the same transfer function when the lens is off centered in the horizontal or tracking direction by 0.15 mm. Both the dB and phase shift curves, 310' and 312' respectively, reveal a disturbance, or glitch, which occurs at approximately 3.2 kHz. The phase margin decrease to approximately 25 degrees, further reducing loop damping and increasing settling time and overshoot. In terms of lens positioning, the horizontal shift in lens position disturbs the symmetry or balance of the fine tracking forces acting on the lens and results in a moment about the optical axis of the lens, resulting in yaw. Thus, it can be seen that the balancing of forces in the assembly 100 about the optical axis O of the objective lens 122 markedly improves tracking position.

Figure 22A:
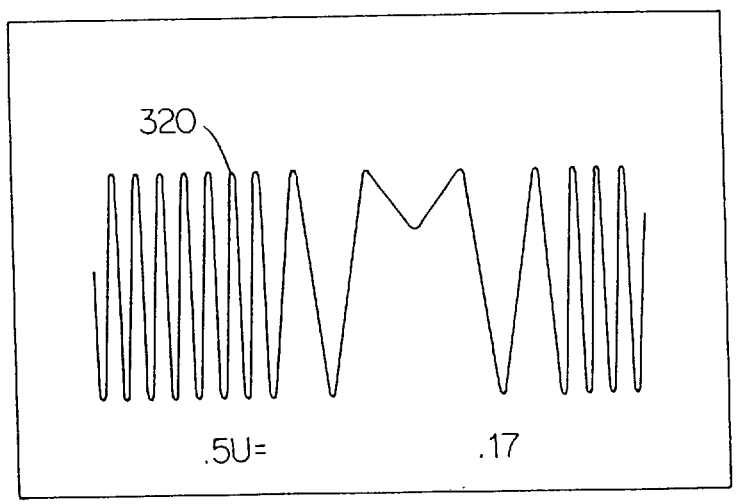
FIGS. 22A–22C illustrate the effects of asymmetrical focus forces acting on the assembly.
Figure 22B:
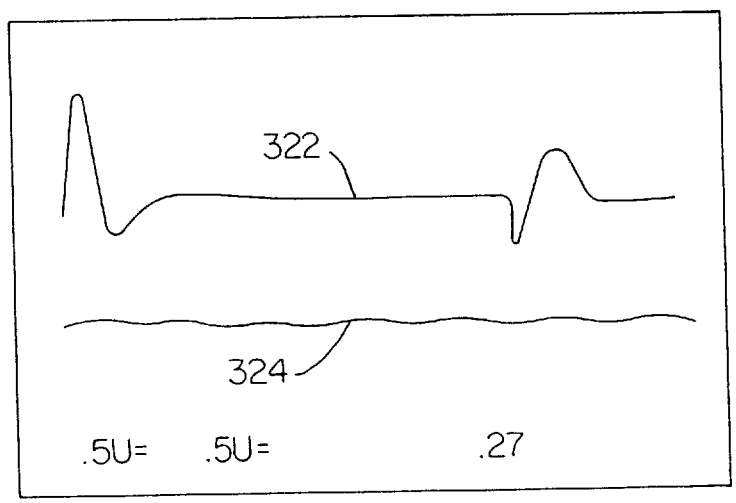
Figure 22C:
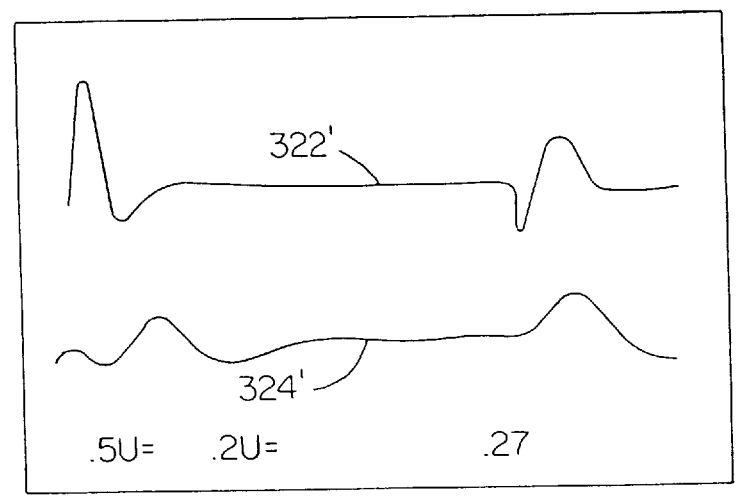

FIGS. 22A–C illustrate the effects of asymmetrical focus forces acting on the assembly 100. FIG. 22A illustrates the tracking signal while crossing tracks for a track pitch of 1.5 um, wherein each sine wave corresponds to an information track on the surface of the optical disc. In FIG. 22B, the focus force is centered with the center of mass of the fine motor $CM_F$ and the optical axis O. The top trace 322 shows the current applied to the focus coil during the step, while the bottom trace 324 shows the tracking error signal while following a particular track, for a focus current of 0.1 Amp, and a focus acceleration of 0.75 m/s². As illustrated, the tracking error signal remains virtually unaffected by the focus current level. FIG. 22C shows the effect on the current and tracking error signals as in FIG. 22B when the focus force is shifted out of alignment with the optical axis O and center of mass $CM_F$ by approximately 0.2 mm. The corresponding curves are identified as trace lines 322' and 324', respectively. The tracking signal is now visibly affected by the focus current. With the same focus current and acceleration, a tracking offset of 0.022 um results. Typically, the total allowable track offset in an optical drive is in the range of 0.05 um to 0.1 um, and thus, by aligning the forces as in FIG. 22B, the tracking offset is significantly reduced.

Figure 23:
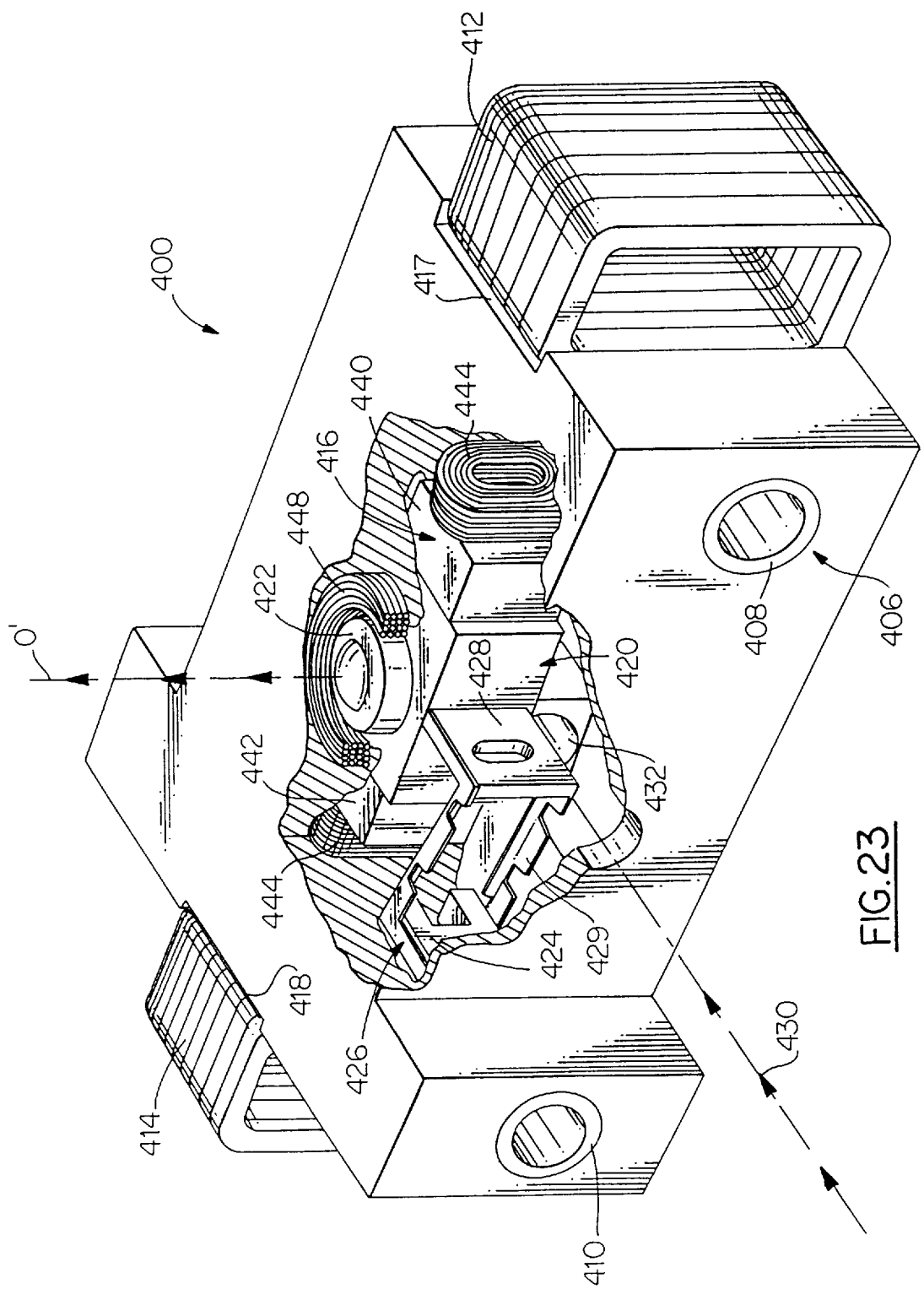
FIG. 23 illustrates an alternative embodiment of a carriage and actuator assembly.

An alternative embodiment of a carriage and actuator assembly in which the center of mass of the 2-D actuator coincides with the center of mass of the carriage mass is illustrated in FIG. 23 as assembly 400. In addition to being substantially symmetrical about the optical axis of the objective lens, the center of mass of the fine motor mass coincides with the center of mass of the carriage mass and is aligned with the optical axis. The carriage and actuator assembly 100 of the first embodiment is adequate for most frequency ranges. The assembly 400 of the alternative embodiment, however, may be used in applications where it is desirable to avoid the shift in the center of mass of the carriage mass at frequencies below the flexure arm resonance frequency.

The assembly 400 includes a carriage 406 having first and second bearing surfaces 408 and 410 substantially identical to those in assembly 100 which can be slidably mounted on guide rails (not shown), and a 2-D actuator 416 which is mounted within the carriage 406. The carriage 406 includes a pair of coarse tracking coils 412 and 414 positioned within respective notches 417 and 418 formed in the carriage 406, adjacent the bearing surfaces 408 and 410, which act to move the carriage 406 horizontally in a tracking direction to access various information tracks on the surface of an optical disc.

The actuator 416 includes a lens holder 420 having an objective lens 422 mounted thereon. A pair of ledges 424 formed on the top surface of the carriage 406 support a pair of top flexure arms 426 which are further attached to the top surfaces of a pair of projections 428 formed on the lens holder 420. A pair of bottom flexure arms 429 which are identical in structure to the top flexure arms 426 are supported by corresponding ledges in the bottom of the carriage (not shown), and attach to the bottom surfaces of the projections 428 on the lens holder 420. A beam of light 430 enters the actuator 416 through a oval aperture 432 and is reflected by a mirror (not shown) contained inside the actuator 416 through the objective lens 422 along an optical axis O'. The actuator 416 is further attached to a focus and fine tracking motor which moves the lens 422 so as to precisely align and focus the exiting beam upon a desired location on the surface of the optical disc. The focus and fine tracking motor includes two permanent magnets 440 and 442 affixed to opposing ends of the lens holder 420. An oval-shaped fine tracking coil 444 is affixed to each permanent magnet 440 and 442, adjacent the carriage bearings 408 and 410. Focus coils 448 are attached to the top and bottom surfaces of the carriage 406 and supported by ledges formed within the interior of the carriage such that the lens holder 420 is positioned between the focus coils 448.

Coarse tracking movement of the carriage 406 and actuator 416 is effected in a manner identical to that of the assembly 100 illustrated in FIGS. 6 and 7. When a current is applied to the coarse tracking coils 412 and 414 in the presence of a magnetic field, a force is generated according to Lorentz law which acts to move the carriage 406 and actuator 416 in a tracking direction so as to position the objective lens 422 beneath various information tracks on the optical disc.

Figure 24:
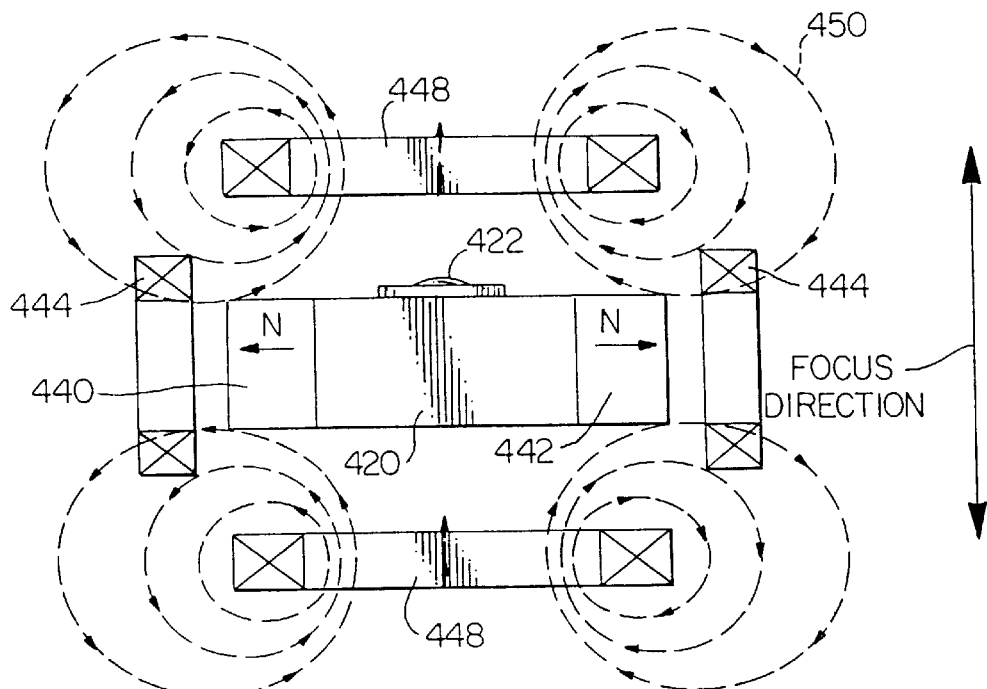
FIG. 24 illustrates the operation of the actuator as employed to move the lens holder in a focusing direction.

FIG. 24 illustrates the operation of the actuator 416 to move the lens holder 420 and objective lens 422 carried thereon in a focusing direction. When a current is generated in the focus coils 448, an electromagnetic field 450 is induced in each of the coils. The electromagnetic field 450 differs in direction for the respective focusing coils as shown. In the example shown, both permanent magnets 440 and 442 will be attracted by the bottom focus coil 448 and repelled by the top focus coil 448, thus moving the objective lens holder 420 toward the bottom focus coil 448 and away from the top focus coil 448 to position the objective lens 422 further away from the surface of the optical disc, wherein the magnitude of the displacement depends on the strength of the induced electromagnetic field.

Figure 25:
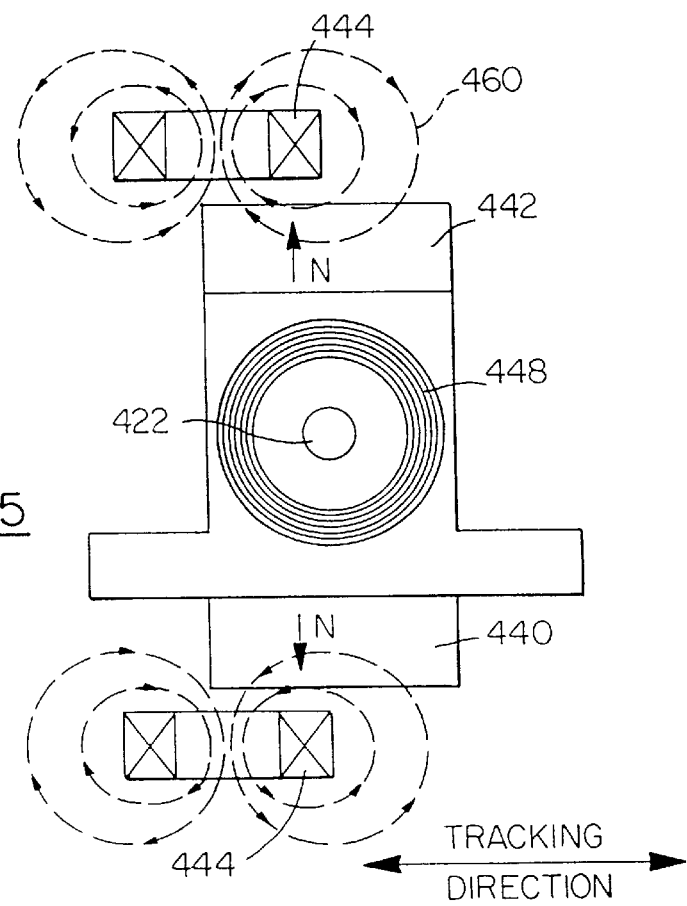
FIG. 25 illustrates the operation of the actuator to move the lens holder in a tracking direction.

In a similar manner, FIG. 25 illustrates the permanent magnets 440 and 442 interacting with the fine tracking coils 444. Energization of the tracking coils 444 moves the lens holder 420 horizontally in the tracking direction to the right or to the left depending upon the direction of current through the coils. For example, in the presence of the magnetic field 460 illustrated, the lens holder 420 and objective lens 422 are moved towards the left. In this manner, the fine tracking coils 444 act to more precisely position the light beam exiting the objective lens 422 within the center of a desired information track on the optical disc.

As described above, the coarse tracking motor of this embodiment operates in a manner identical to that of the coarse tracking motor in the assembly 100. The coarse tracking coils 412 and 414 are of identical dimensions and are positioned at equal distances from the optical axis O' of the objective lens 422. Equal currents are applied to the coils such that forces $F_{Coarse1}'$ and $F_{Coarse2}'$ acting on the carriage 406 act at equal distances $L_{C1}'$ and $L_{C2}'$ from the optical axis O'. In the vertical plane, in the radial direction, these forces $F_{Coarse1}'$ and $F_{Coarse2}'$ are aligned with the coincident centers of gravity of the fine motor mass $CM_F'$ and carriage mass $CM_C'$, thereby minimizing carriage and actuator pitch. In a similar manner, the bearing surfaces 408 and 410 are positioned at equal distances from the optical axis O' such that the carriage suspension forces are also symmetric about the optical axis O'. Each force $F_{Bearing1}$ and $F_{Bearing2}$ acts an equal distance $L_{Bearing1}'$ from the optical axis O' such that the moments produced about the optical axis are equal and carriage and actuator pitch is further reduced. The surface area of the bearings which contacts the rails is designed to be substantially equal such that the friction forces acting on the carriage are substantially equal. Since the bearing surfaces 408 and 410 are positioned equidistantly from the optical axis O', the moments acting about the optical axis are equal and carriage and actuator is minimized. The assembly is further designed such that the friction forces are vertically aligned with the center of mass of the carriage 406 and actuator 416.

The fine tracking coils 444 are of equal dimensions and the current applied to the coils is equal such that the fine tracking forces acting on the actuator are equal. Further, the fine tracking coils 444 are positioned at equal distances $L_T'$ from the optical axis O' such that the moments produced about this axis are equal. In the vertical plane, these forces $F_{Track1}'$ and $F_{Track2}'$ are also aligned with the centers of gravity of the actuator 416 and carriage 406, such that pitch of the actuator 416 is reduced. Since the fine tracking forces acting on the assembly are equal, it follows that the reaction forces $F_{React1}'$ and $F_{React2}'$ produced in response to the tracking forces $F_{Track1}'$ and $F_{Track2}'$ are equal as well. These reaction forces act at equal distances $L_R'$ from the optical axis and are vertically aligned with the centers of gravity, such that moments about the optical axis O' are equal and yaw is reduced.

In a similar manner, the focus coils 448 have substantially equal dimensions and current applied to them such that the focus coils 448 produce equal forces $F_{Focus1}'$ and $F_{Focus2}'$ acting on the actuator. In this embodiment, however, the focus coils 448 are located at equal distances $L_F'$ from the coincident centers of gravity of the fine motor mass and carriage mass such that the moments about the optical axis O' are equal. Further, because the focus forces $F_{Focus1}'$ and $F_{Focus2}'$ are equal, the focus reaction forces $F_{FR1}'$ and $F_{FR2}'$ acting on the fine motor mass are equal and act at equal distances $L_{FR}$ 'from the coincident centers of gravity of the carriage mass CM' and fine motor mass $CM_F'$. Thus, moments produced by the reaction forces about the optical axis are equal and actuator pitch is further minimized. The flexure forces $F_{Flex1}'$, $F_{Flex2}'$, acting on the actuator and fine motor reaction forces $F_{RA}'$, $F_{RB}'$, produced in response to the flexure forces are effectively the same as those illustrated in FIG. 14 for the assembly 100. Because the flexure and reactions forces are not symmetrical about the optical axis O', the moments produced by these pairs of forces about the axis O' are not equal. These forces, however, are effectively decoupled from the carriage except at low frequencies (typically below around 40 Hz), such that these moments do not affect actuator performance under most operating conditions.

Thus, the motor and reaction forces acting on the assembly 400 are symmetric about the optical axis O' and are vertically in alignment with the centers of gravity of the fine motor mass $CM_F'$ and carriage mass $CM_C'$. Because the centers of gravity of the fine motor mass and carriage mass coincide, decoupling of the actuator or any of the subparts of the assembly will not shift the center of mass, and the forces and moments acting on the assembly will remain balanced for virtually all horizontal and vertical accelerations.

Figure 26:
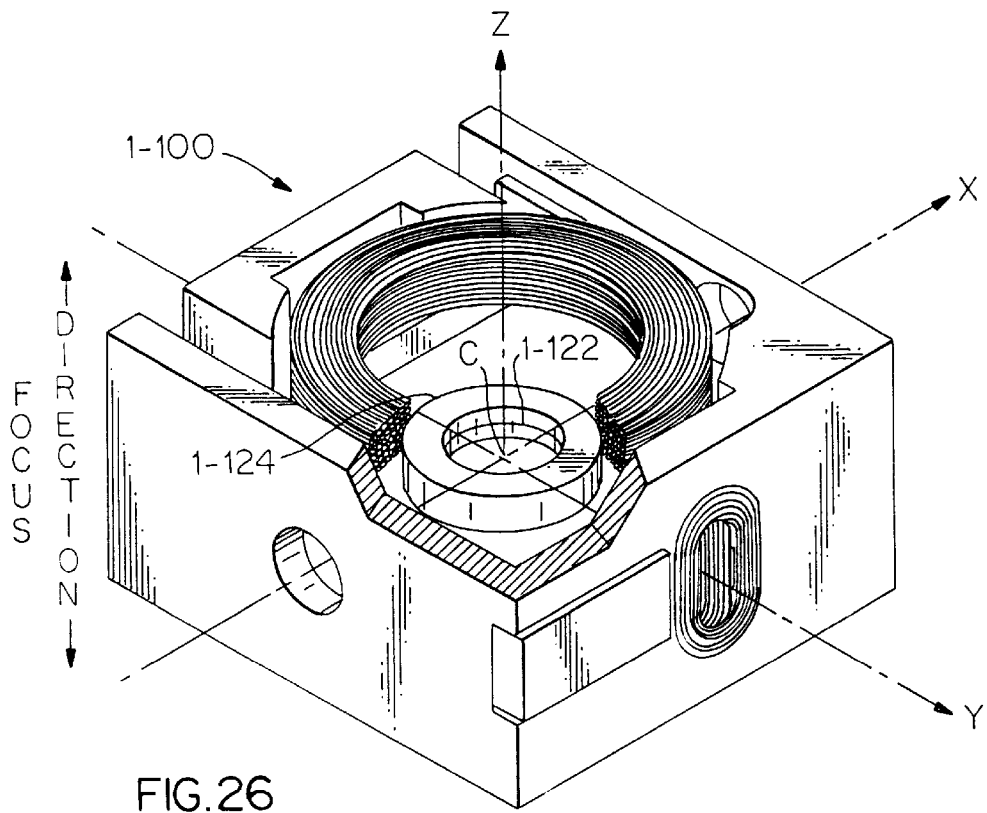
FIG. 26 is an isometric view of an alternate embodiment of an actuator in accordance with the present invention.

Turning now to FIG. 26, there is shown an alternate embodiment of the invention. An actuator 1-100 is constructed in a generally similar manner to the actuator of the first embodiment. In assembly within a drive, the center of gravity C of the fine motor mass as previously defined lies within the actuator, and defines the origin of a coordinate system having mutually orthogonal X, Y, and Z axes. An objective lens 1-122 has an optical axis that is collinear with the Z axis. The objective lens 1-122 is mounted within a collar 1-124 within the interior of the actuator 1-100, such that the centers of gravity of the lens, and of the unit formed by the lens 1-122 and the collar 1-124 both coincide with the center of gravity C of the fine motor mass. In this embodiment the center of mass of the carriage mass lies on the optical axis of the objective lens 1-122, and also coincides with the center of gravity C of the fine motor mass.

Figure 27:
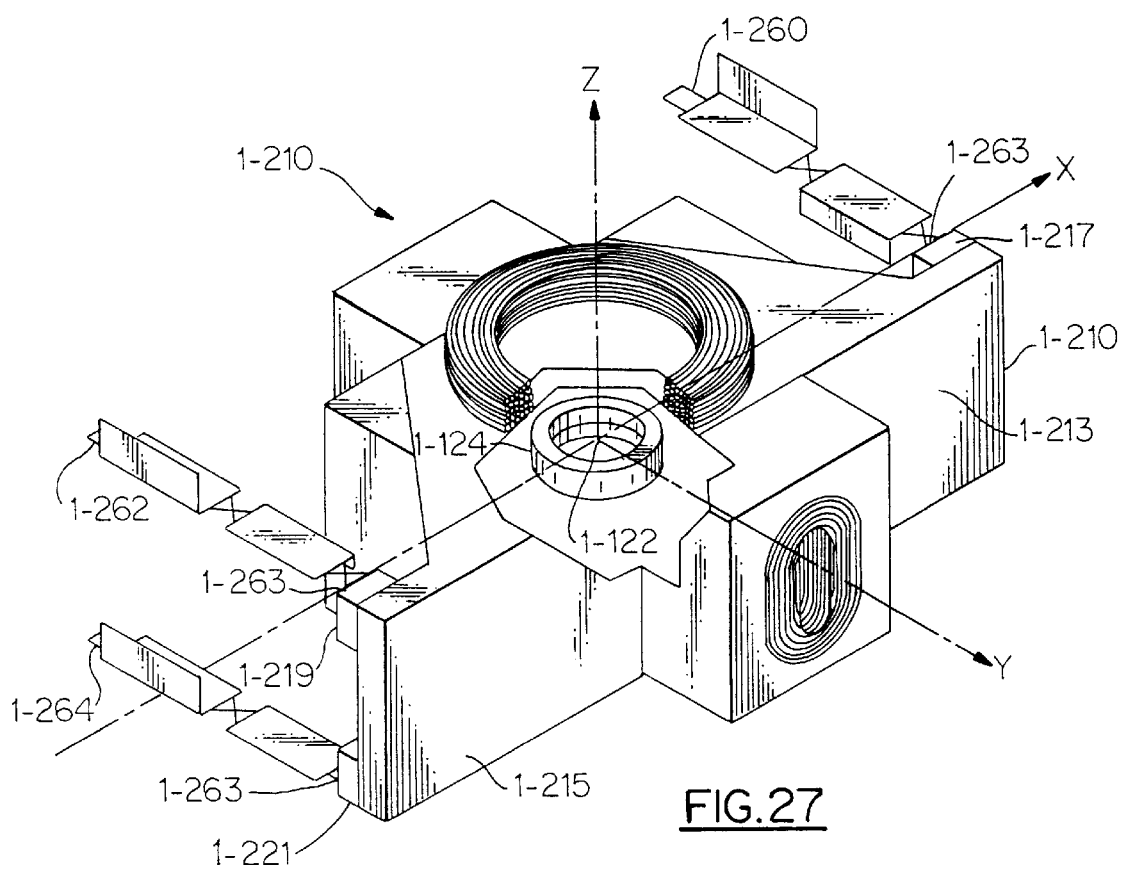
FIG. 27 is a view similar to FIG. 26 with flexures attached.

As in the first embodiment, the objective lens 1-122 is positioned within a lens holder 1-210, as shown in FIG. 27. The lens holder 1-210 is provided with symmetrical shoulders 1-213, 1-215, from which extend, respectively, a pair of symmetrical upper arms 1-217, 1-219, and a pair of symmetrical lower arms 1-221 disposed on opposite sides of the lens holder 1-210. Of the lower arms, only one lower arm 1-221 is shown in FIG. 27, it being understood that a second lower arm 1-221 is positioned on the opposite side of the lens holder 1-210. Flexures 1-260, 1-262 are attached to the ends of the upper arms 1-217, 1-219 respectively, for suspension of the lens holder 1-210 within the actuator as more fully described with respect to the first embodiment. Flexures are similarly attached to the lower arms as well and function in the same manner as the flexures 1-260, 1-262, but in the interest of brevity, only the upper flexures need be discussed.

In accordance with one aspect of this invention, the upper arms 1-217, 1-219, and the lower arms extend forward to the XZ plane such that a discrete hinge action occurs at a hinge point 1-263 at the ends of the arms, about a vertical axis lying precisely in the XZ plane. Providing hinge action at the hinge points 1-263 minimizes moments about the Z-axis when the objective lens 1-122 is being moved in a tracking direction, so that there is no tendency for the actuator to yaw about the Z-axis. It is possible for the flexures to be constructed so that they do not attach precisely at the XZ plane, so long as the hinging action occurs in the XZ plane.

The flexures 1-260, 1-262, and the lower flexures can be the flexures described in Schell et al., U.S. Pat. No. 5,313, 332, which is incorporated herein by reference.

The actuator 1-100 is mounted on a base 150 (FIG. 3) and is operated in the same manner as the actuator of the first embodiment.

Repeating the analysis of inertial forces for this embodiment, it will be seen that when subjected to horizontal acceleration along the X-axis, the carriage mass and the fine motor mass move as a unit having a net center of mass that exactly coincides with the origin C. This is true whether the horizontal acceleration occurs at low frequencies below the resonance frequency of the flexures, or at frequencies above the resonance frequencies, when the components of the assembly decouple. Thus the center of mass of the carriage mass and the center of mass of the fine motor mass never shift with respect to one another, and, due to the arrangement of the flexures as discussed hereinabove, the fine motor mass has no tendency to yaw about the Z-axis during coarse or fine tracking.

As in the first embodiment, the actuator 1-100 may be provided with a fine focus drive and a fine tracking drive, as appropriate for a desired application. The actuator 1-100 is particularly suitable for applications that can tolerate a relatively large working distance for the objective lens 1-122.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. An apparatus for optically reading or recording information on an optical disc which is rotatable about an axis of rotation, said apparatus comprising:

a frame;

a carriage movable relative to said frame along a path orthogonal to said axis of rotation;

a carriage drive for driving said carriage along said orthogonal path, portions of said carriage drive being mounted on said carriage, said carriage and said mounted portions of said carriage drive defining a center of carriage mass;

an objective lens having an optical axis and a center of lens mass, said optical axis being collinear with a Z-axis;

an objective lens holder for mountably securing said objective lens, said objective lens holder being movable relative to said carriage, said objective lens holder receiving a beam of light traveling along an X-axis, said Z-axis and said X-axis forming an XZ plane;

flexure means for movably supporting said objective lens holder relative to said carriage, said flexure means having at least one hinge point within said XZ plane so that movement of said objective lens holder is provided by hinge action at said at least one hinge point; and a focus drive for driving said objective lens holder to move said objective lens along its optical axis, said focus drive and said objective lens holder defining a center of fine motor mass, said center of fine motor mass, said center of carriage mass, and said center of lens mass being substantially coincident on said optical axis so that when said objective lens holder is moved in a tracking direction, moments about said Z-axis are thereby minimized.

2. The apparatus according to claim 1 further including a fine tracking drive for driving said objective lens holder relative to said carriage along said orthogonal path.

3. The apparatus according to claim 1 wherein said flexure means includes a plurality of flexures suspending said objective lens holder from said carriage, said flexures being attached to said objective lens holder about said optical axis at attachment points that are disposed in said XZ plane.

4. An apparatus for optically reading or recording information on, an optical disc which is rotatable about an axis of rotation, said apparatus comprising:

a frame;

a carriage movable relative said frame along a path orthogonal to said axis of rotation;

a carriage drive for driving said carriage along said orthogonal path, portions of said carriage drive being mounted on said carriage, said carriage and said mounted portions of said carriage drive defining a center of carriage mass;

an objective lens having an optical axis and a center of lens mass, said optical axis bearing collinear with a Z-axis;

an objective lens holder for mountably securing said objective lens, said objective lens holder being movable relative to said carriage to move said objective lens along said optical axis, said objective lens holder receiving a beam of light traveling along an X-axis, said Z-axis and said X-axis forming an XZ plane;

a plurality of flexures for suspending said objective lens holder from said carriage, said flexures being symmetrically attached to said objective lens holder about said optical axis at attachment points that are disposed in said XZ plane, each of said plurality of flexures having a hinge point in said XZ plane thereby allowing relative movement of said objective lens holder so that when said objective lens holder is moved in a tracking direction, moments about said Z-axis are minimized;

a focus drive for driving said holder to move said objective lens along its optical axis, said focus drive and said objective lens holder defining a center of fine motor mass; and a fine tracking drive for driving said holder to make fine adjustments in the relative position of said objective lens along said orthogonal path, said center of fine motor mass, said center of carriage mass, and said center of lens mass being substantially coincident on said optical axis.

5. An apparatus for controlling the position of a lens, said apparatus comprising:

a suspended body for receiving a beam of light traveling along an X-axis;

a lens disposed in said suspended body defining an optical axis being collinear with a Z-axis, a center of mass of said suspended body being disposed substantially on said optical axis, and a center of mass of said lens being coincident with said center of mass of said suspended body;

a carriage cooperatively associated with said suspended body for relative motion therewith with at least one degree of freedom, said carriage having a center of mass being within 0.1 mm of said optical axis proximate said center of mass of said suspended body, said carriage having an initial attitude with respect to three mutually orthogonal planes of reference defined by said X-axis, a Y-axis, and said Z-axis so that suspensory forces of said carriage acting on said suspended body are symmetric about said optical axis;

flexure means for movably supporting said suspended body relative said carriage, said flexure means having at least one hinge point within an XZ plane defined by said X-axis and Z-axis allowing movement of said suspended body by hinge action at said at least one hinge point; and first drive means acting on said carriage for producing a first plurality of forces that are balanced and symmetric about said optical axis to accelerate said carriage and said suspended body therewith at different frequencies along said Y axis, moments produced by said first plurality of forces about said center of mass of said carriage being thereby effectively absents, forces reactive to said first plurality of forces being balanced and symmetric with respect to said optical axis producing insubstantial moments about said center of mass of said carriage, and inertial forces developed by said first drive means on said carriage being balanced and symmetric about said optical axis so that said carriage maintains its said attitude with respect to said planes of reference during acceleration thereof, and said suspended body maintains an initial position with respect to said carriage.

6. The apparatus according to claim 5 further including second drive means for producing a second plurality of forces that are balanced and symmetric about said optical axis to accelerate said suspended body relative to said carriage at different frequencies along said Z-axis so that moments produced by said second plurality of forces about said center of mass of said suspended body are effectively absent, forces reactive to said second plurality of forces are balanced and symmetric with respect to said optical axis and produce insubstantial moments about said center of mass of said suspended body, and inertial forces developed by said second drive means on said suspended body are balanced and symmetric about said optical axis.

7. The apparatus according to claim 6 further including third drive means for producing a third plurality of forces that are balanced and symmetric about said optical axis to accelerate said suspended body relative to said carriage at different frequencies along said Y-axis so that moments produced by said third plurality of forces about said center of mass of said suspended body are effectively absent, forces reactive to said third plurality of forces are effectively balanced and symmetric with respect to said optical axis, and inertial forces developed by said third drive means on said suspended body are balanced and symmetric about said optical axis.

8. The apparatus according to claim 5 further including third drive means for producing a third plurality of forces that are balanced and symmetric about said optical axis to accelerate said suspended body relative to said carriage at different frequencies along said Y-axis so that moments produced by said third plurality of forces about said center of mass of said suspended body are effectively absent, forces reactive to said third plurality of forces are effectively balanced and symmetric with respect to said optical axis, and inertial forces developed by said third drive means on said suspended body are balanced and symmetric about said optical axis.

9. The apparatus according to claim 5 wherein said flexure means includes a plurality of flexures that attach said suspended body to said carriage for suspension therefrom, each of said flexures opposing a corresponding flexure disposed on an opposite side of said Z-axis and equidistant therefrom, and each of said flexures pivotally flexing about intersections thereof with said XZ plane at respective hinge points.

10. The apparatus according to claim 9 wherein said flexures attach to said suspended body in said XZ plane.

* * * * *